(12) United States Patent
Takatsu et al.

(10) Patent No.: US 11,006,042 B2
(45) Date of Patent: May 11, 2021

(54) IMAGING DEVICE AND IMAGE PROCESSING METHOD

(71) Applicants: Koji Takatsu, Tokyo (JP); Susumu Fujioka, Kanagawa (JP)

(72) Inventors: Koji Takatsu, Tokyo (JP); Susumu Fujioka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/880,040

(22) Filed: May 21, 2020

(65) Prior Publication Data

US 2020/0382700 A1    Dec. 3, 2020

(30) Foreign Application Priority Data

May 31, 2019    (JP) .............................. JP2019-103118

(51) Int. Cl.
  *H04N 5/232*    (2006.01)
  *H04N 5/247*    (2006.01)
  *G06T 5/50*     (2006.01)
  *G06T 5/00*     (2006.01)

(52) U.S. Cl.
  CPC ......... *H04N 5/23238* (2013.01); *G06T 5/009* (2013.01); *G06T 5/50* (2013.01); *H04N 5/247* (2013.01); *G06T 2207/20216* (2013.01)

(58) Field of Classification Search
  None
  See application file for complete search history.

(56) References Cited

U.S. PATENT DOCUMENTS

| | | |
|---|---|---|
| 5,917,470 A | 6/1999 | Fujioka |
| 6,297,802 B1 | 10/2001 | Fujioka |
| 2005/0156943 A1 | 7/2005 | Fujioka et al. |
| 2006/0187475 A1 | 8/2006 | Fujioka |
| 2007/0127455 A1 | 6/2007 | Fujioka |
| 2007/0280219 A1 | 12/2007 | Shimizu et al. |
| 2010/0033756 A1 | 2/2010 | Fujioka |
| 2010/0195123 A1 | 8/2010 | Fujioka |
| 2011/0170124 A1 | 7/2011 | Fujioka |
| 2013/0114862 A1* | 5/2013 | Hohjoh .................... G06K 9/68 382/107 |

(Continued)

FOREIGN PATENT DOCUMENTS

| | | |
|---|---|---|
| JP | 2002-218292 | 8/2002 |
| JP | 2014-057156 | 3/2014 |
| JP | 2015-019344 | 1/2015 |

*Primary Examiner* — Rebecca A Volentine
(74) *Attorney, Agent, or Firm* — IPUSA, PLLC

(57) ABSTRACT

An imaging device includes a plurality of image sensors, and circuitry configured to determine whether a difference between average brightness values of first image data and second image data, both captured by a same image sensor, is equal to or greater than a first threshold. The second image data is captured at a timing later than capture of the first image data. The circuitry perform one of a) output of image data captured by a rest of the plurality of image sensors excluding the one of the plurality of image sensors and b) composition of the image data captured by the rest of the plurality of image sensors, in response to a determination that the difference in average brightness value is equal to or greater than the first threshold and the average brightness value of the second image data is equal to or smaller than a second threshold.

8 Claims, 26 Drawing Sheets

(56) References Cited

U.S. PATENT DOCUMENTS

| | | |
|---|---|---|
| 2015/0222816 A1 | 8/2015 | Shohara et al. |
| 2016/0072975 A1 | 3/2016 | Fujioka |
| 2016/0134817 A1* | 5/2016 | Yoshikawa .......... G06K 9/4661 348/239 |
| 2016/0284076 A1* | 9/2016 | Voros ................... H04N 17/002 |
| 2018/0159998 A1 | 6/2018 | Fujioka |
| 2020/0158876 A1* | 5/2020 | Karadeniz ............... H04W 4/38 |

\* cited by examiner

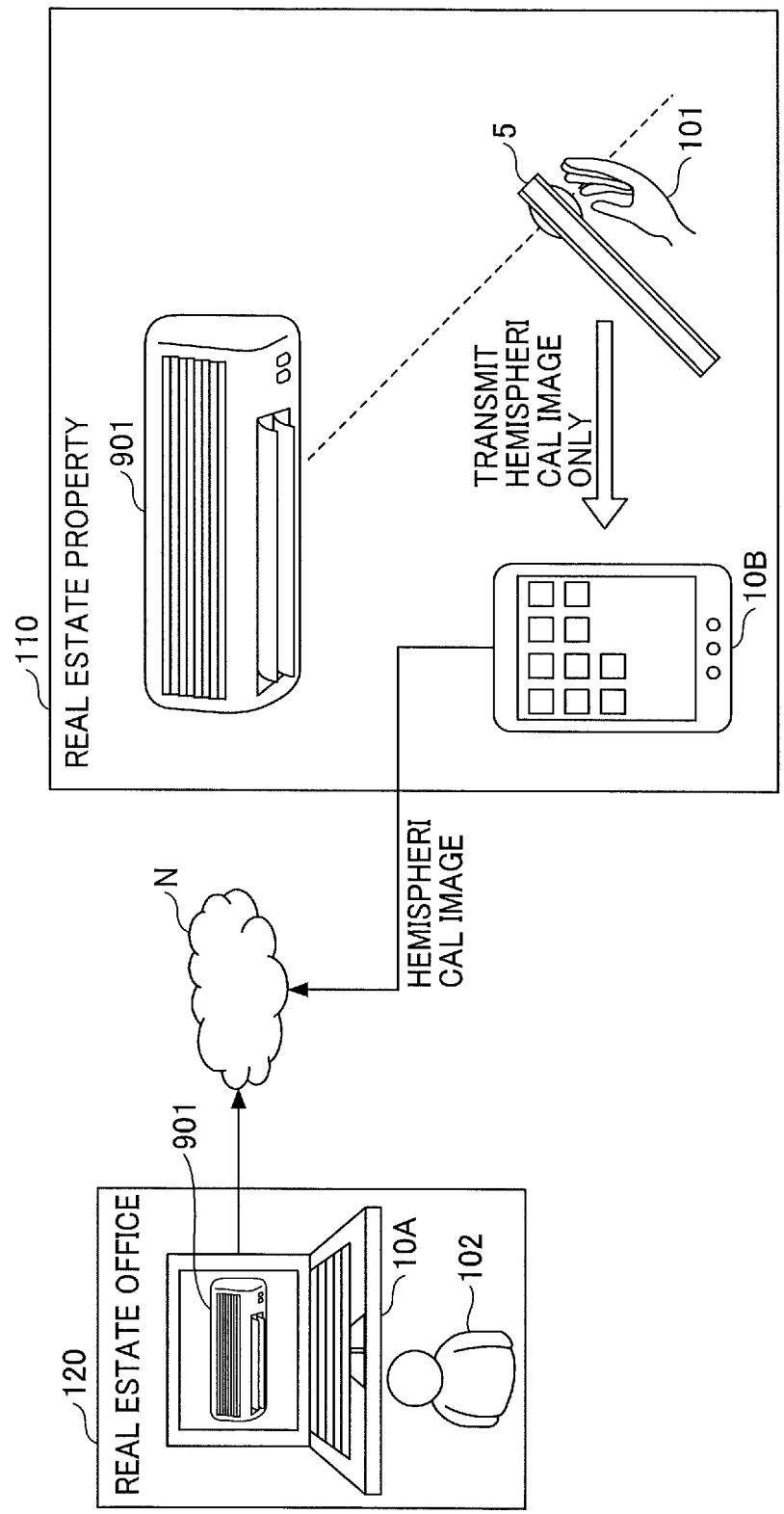

FIG. 9A
FIG. 9B
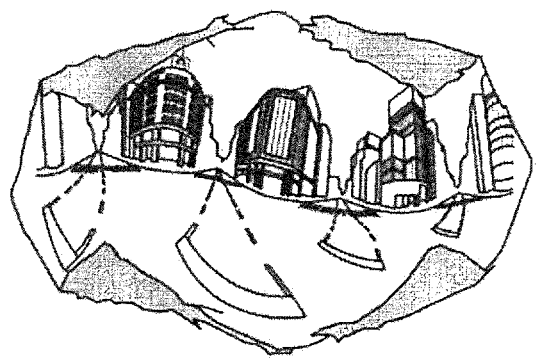
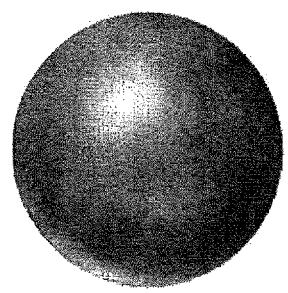
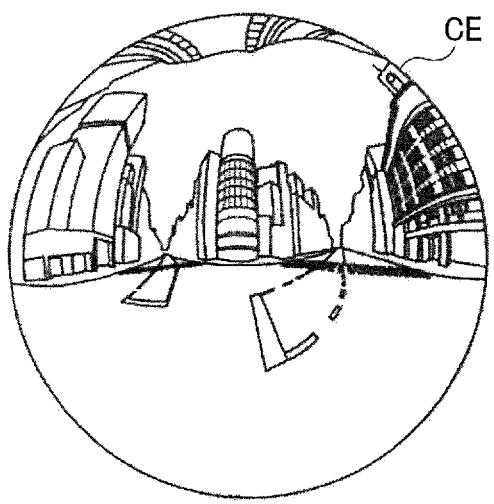

IMAGING DEVICE AND IMAGE PROCESSING METHOD

CROSS-REFERENCE TO RELATED APPLICATION

This patent application is based on and claims priority pursuant to 35 U.S.C. § 119(a) to Japanese Patent Application No. 2019-103118, filed on May 31, 2019, in the Japan Patent Office, the entire disclosure of which is hereby incorporated by reference herein.

BACKGROUND

Technical Field

Embodiments of the present disclosure relate to an imaging device, an image processing method, and a storage medium storing program codes that causes a computer to perform the method.

Related Art

There are imaging devices that use a plurality of wide-angle lenses, such as a fisheye lens and an ultra wide-angle lens, to capture an omnidirectional image or a 360-degree image at a time. Such an imaging device projects an image from each lens onto each image sensor and combines the obtained images by image processing, thereby generating a 360-degree image (spherical image.)

SUMMARY

An embodiment of this disclosure provides an improved imaging device that composites image data respectively captured by a plurality of image sensors to generate wide-angle image data having an angle greater than image data captured by a single one of the plurality of image sensors. The imaging device includes the plurality of image sensors and circuitry. The circuitry is configured to obtain an average brightness value of first image data and an average brightness value of second image data both captured by a same one of the plurality of image sensors, obtain a difference between the average brightness value of the first image data and the average brightness value of the second image data, determine whether the difference in average brightness value is equal to or greater than a first threshold, and determine whether the average brightness value of the second image data is equal to or smaller than a second threshold. The second image data is captured at a timing later than capture of the first image data. In response to a determination that the difference in average brightness value is equal to or greater than the first threshold and the average brightness value of the second image data is equal to or smaller than the second threshold, the circuitry is configured to perform one of output of image data captured by a rest of the plurality of image sensors excluding the one of the plurality of image sensors, and composition of the image data captured by the rest of the plurality of image sensors.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2 is a diagram illustrating a schematic operation of the image communication system illustrated in FIG. 1, for a case where a real estate agent at a real estate property presents a customer in a real estate office a given range of the real estate property;

FIG. 9A illustrates a concept of mapping of the equirectangular projection image on a surface of a sphere;

FIG. 9B illustrates a spherical image based on the image illustrated in FIG. 9A;

Figure 1:
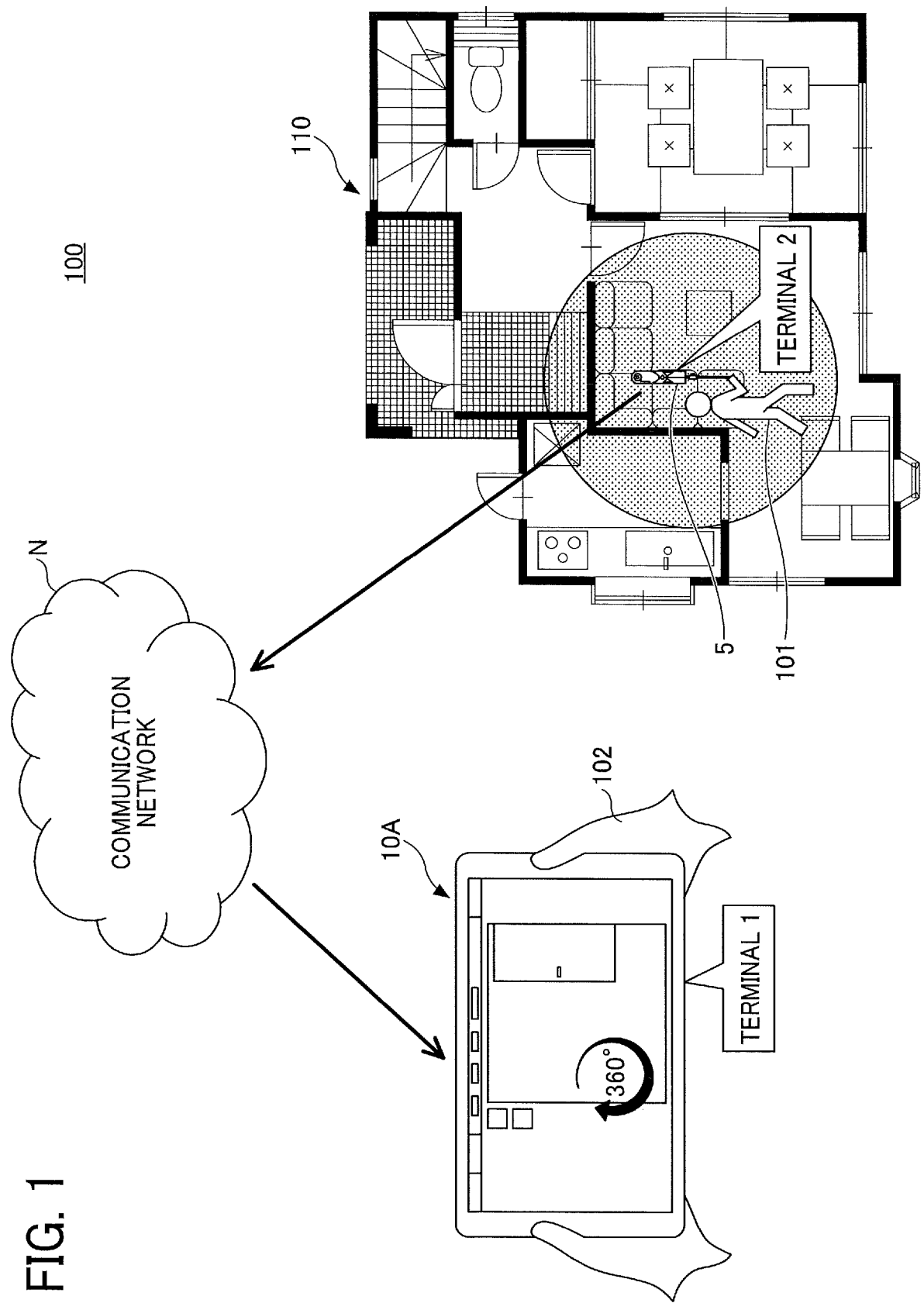
FIG. 1 is a diagram illustrating an example of use of an image communication system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, embodiments of this disclosure are described. As used herein, the singular forms "a," "an," and "the" are intended to include the plural forms as well, unless the context clearly indicates otherwise.

Descriptions are given below of an imaging device and an image processing method performed by the imaging device according to embodiments of the present disclosure, with reference to the drawings.

Overview of Image Communication System

FIG. 1 is a diagram illustrating an example of use of an image communication system 100 according to an embodiment of the present disclosure. A real estate agent 101 at a real estate property 110 moves through rooms while capturing a spherical image (360-degree image) of the property with the imaging device 5 (a terminal 2) held by hand. The imaging device 5 transmits a spherical image (motion video) to a communication terminal 10A (a terminal 1) in a real estate office in real time via a communication network N. The communication terminal 10A displays a predetermined range of the received spherical image on a display that is flat.

A customer 102 at the real estate office can operate the communication terminal 10A to rotate the spherical image (to display a given range thereof), and can view the property from any direction while remaining at the real estate office.

A description is given below of a case where the real estate agent 101 at the real estate property 110 presents, for example, an air conditioner installed in a room of the real estate property 110, to the customer 102. Conventionally, the real estate agent 101 describes verbally where the air conditioner is in the spherical image, but communication may not be smooth, making the description cumbersome.

In view of the foregoing, according to the present embodiment, the image communication system 100 enables the real estate agent 101 to easily display a desired subject on the communication terminal 10A operated by the customer 102 as follows.

With reference to FIG. 2, a schematic description is given below of an operation of the image communication system 100. FIG. 2 is a diagram schematically illustrating an operation of the image communication system 100 in a case where the real estate agent 101 at the real estate property 110 (site B) presents a given range of the real estate agent 101 to the customer 102 in a real estate office 120 (site A).

The imaging device 5, which is held by the real estate agent 101 and can capture a spherical image, includes two or more image sensors. The imaging device 5 in the present embodiment includes two image sensors, but aspects of the present disclosure can be adapted to an imaging device including three or more image sensors. The imaging device 5 combines (composites) the image data captured by the two image sensors, to generate a spherical image.

For example, when the real estate agent 101 wants to describe an air conditioner 901 while presenting the air conditioner 901 to the customer 102, the real estate agent 101 blocks light entering the image sensor on the side farther from the air conditioner 901. In FIG. 2, a lens on the side farther from the air conditioner 901 is shielded from light with the palm of the hand. When the imaging device 5 detects that the brightness detected by one of the two image sensors has significantly decreased, the imaging device 5 does not combine the image data respectively captured by the two image sensors, but transmits only the image data in which the brightness has not decreased to the communication terminal 10A in the real estate office 120. In the present embodiment, a 360-degree (spherical) image is obtained by compositing the image data respectively captured by the two image sensors. Therefore, the image data captured by one image sensor is referred to as a hemispherical image or 180-degree image, and a combination of the two image data respectively captured by the two image sensors is referred to as a spherical image or 360-degree image.

Although the communication terminal 10A in the real estate office 120 displays the entire hemispherical image, the real estate agent 101 captures the image so that the air conditioner 901 is at the center of the optical axis of the imaging device 5. Therefore, the air conditioner 901 is substantially near the center on the display of the communication terminal 10A and thus, the customer 102 does not need to adjust the display range to view the air conditioner 901.

As described above, the image communication system 100 according to the present embodiment can execute switching from a spherical image to a hemispherical image and display a given range from a wide-angle image. In addition, the switching can be made by an intuitive action, without using a hardware switch. Therefore, the customer 102 can view the object that the real estate agent 101 wants to present, without description of location of the object by the real estate agent 101.

Overview of Image Communication System

Figure 3A:
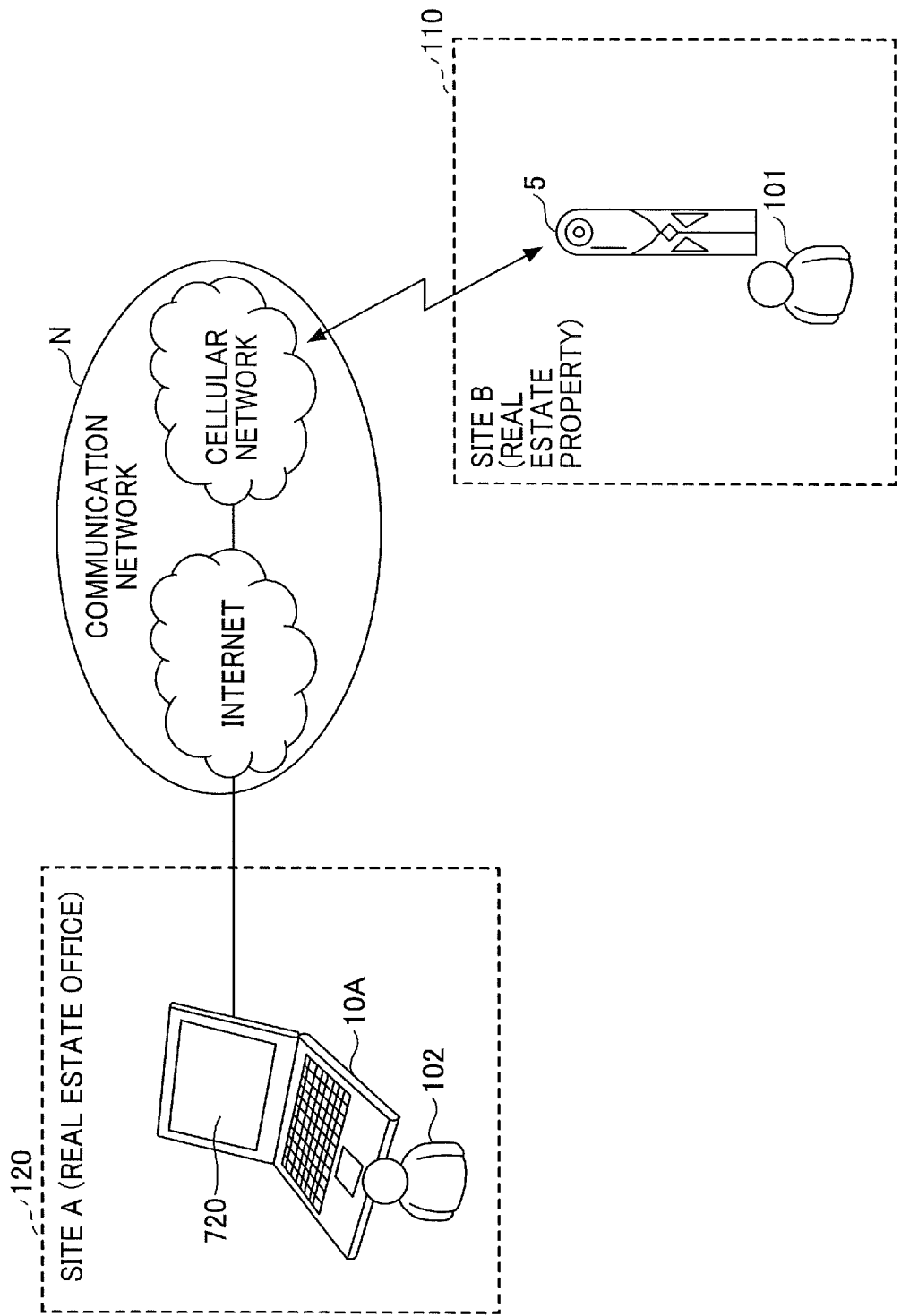
FIG. 3A is a schematic diagram illustrating an example of a configuration of the image communication system illustrated in FIG. 1.
Figure 3B:
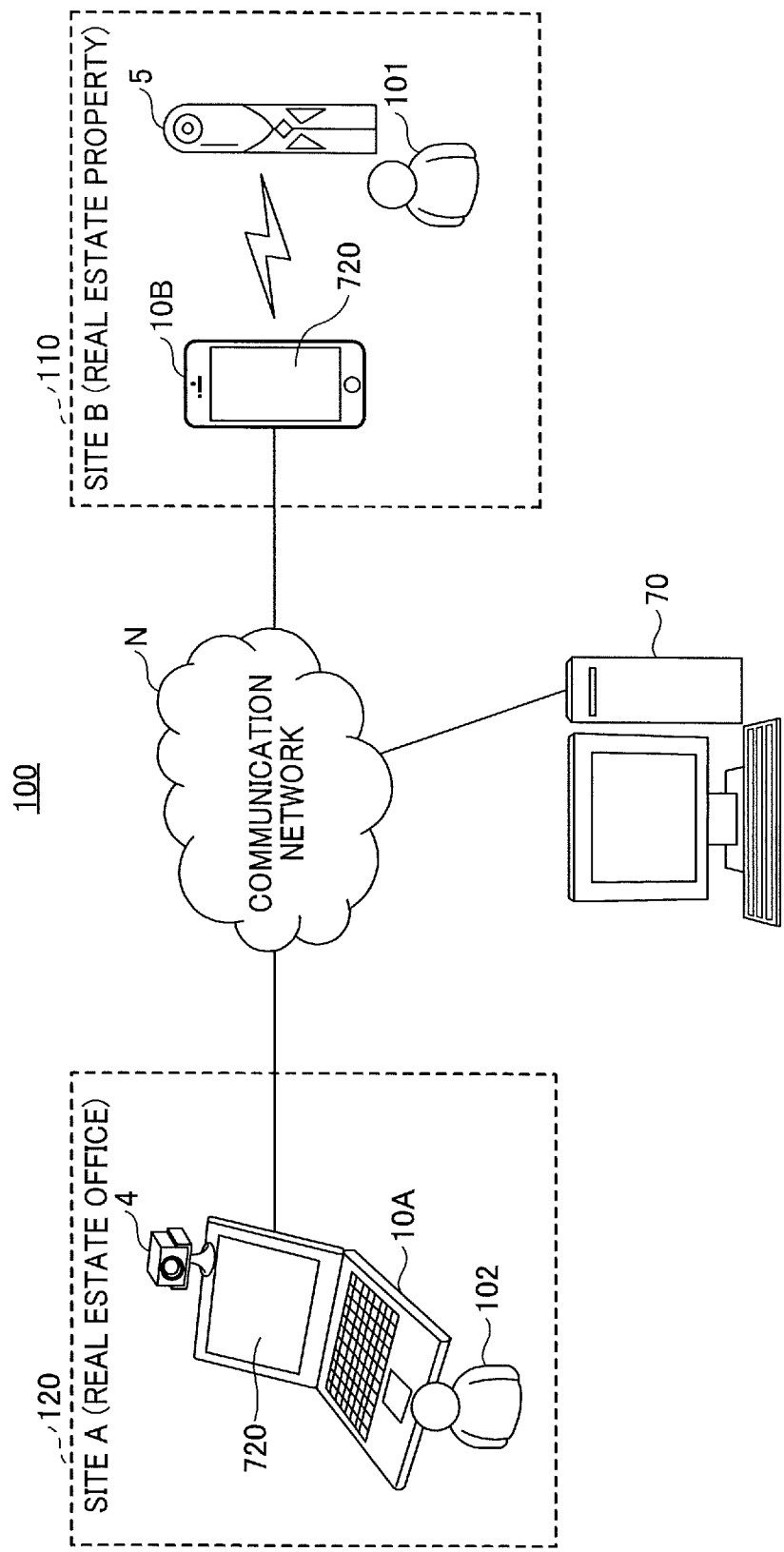
FIG. 3B is a schematic diagram illustrating another example of the configuration of the image communication system illustrated in FIG. 1.

Referring to FIGS. 3A and 3B, an overview of a configuration of the image communication system 100 according to the present embodiment is described. FIGS. 3A and 3B are schematic diagrams illustrating the configurations of the image communication system 100 according to the present embodiment.

As illustrated in FIG. 3A, in the image communication system 100 according to the present embodiment, the communication terminal 10A at the site A can communicate with the imaging device 5 at the site B via a communication network N such as the Internet or a cellular network. The site A is, for example, the real estate office 120 where the customer 102 stays, and the site B is, for example, the real estate property 110 to be viewed.

As described above, the imaging device 5 is a special digital camera that captures images of a subject, a landscape, and the like, and combines images to generate two hemispherical images, which form the basis of a spherical image.

The communication terminal 10A is a general-purpose information processing apparatus that runs an application software for video conferencing, to communicate with a communication terminal at another site. The communication terminal 10A is, for example, a laptop personal computer (PC), a mobile phone, a smartphone, a tablet terminal, a car navigation, a game machine, a personal digital assistant (PDA), a wearable PC, a desktop PC, or the like, but is not limited thereto.

The communication terminal 10A includes a display 720 to display the received image thereon.

In addition, Open Graphics Library for Embedded Systems (OpenGL ES) is installed on the communication terminal 10A, and the communication terminal 10A can generate a partial area image from the spherical image transmitted from the imaging device 5. Therefore, the communication terminal 10A can display a partial area image (hereinafter simply "area image") extracted from the spherical image.

At least one customer 102 is at the site A, and the communication terminal 10A displays, on the display 720, a video (spherical image or hemispherical image) captured by the imaging device 5. The customer 102 at the site A is a user who views the hemispherical image, or the spherical image switched by the real estate agent 101. However, the number of the customers 102 is not limited to one.

At least one real estate agent 101 is at the site B and carries the imaging device 5 with a hand or a bar to which the imaging device 5 is attached. The real estate agent 101 can move together with the imaging device 5. The real estate agent 101 is a photographer who captures images of the real estate property 110. However, the number of the real estate agents 101 is also not limited to one.

As illustrated in FIG. 3B, in another example of the image communication system 100, another communication terminal 10B is at the site B. At least the two communication terminals 10A and 10B respectively located at the sites A and B communicate with each other via the communication network N such as the Internet. The communication terminals 10A and 10B can share the video. The communication terminals 10A and 10B are also collectively referred to as "communication terminals 10." An imaging device 4 and the communication terminal 10A are at the site A, and the communication terminal 10B and the imaging device 5 are at the site B. The site A is, for example, the real estate office 120 where the customer 102 stays, and the site B is, for example, the real estate property 110 to be viewed.

As described above, the imaging device 5 is a special digital camera that captures images of a subject, a landscape, and the like, and combines images to generate two hemispherical images, which are the base of a spherical image. By contrast, the imaging device 4 is a general-purpose digital camera that captures an image of an object or a landscape to obtain a general planar image.

The communication terminals 10A and 10B are general-purpose information processing apparatuses that run application software for video conferencing to communicate with terminals at other sites. Each of the communication terminals 10A and 10B is, for example, a laptop personal computer (PC), a mobile phone, a smartphone, a tablet terminal, a car navigation, a game machine, a personal digital assistant (PDA), a wearable PC, a desktop PC, or the like, but is not limited thereto.

The communication terminal 10A displays the image of the video communication on the display 720 of the communication terminal 10A. The communication terminal 10A captures an image of the customer 102 or the like using the external imaging device 4.

The communication terminal 10B displays the image of the video communication on the display 720 of the communication terminal 10B. The communication terminal 10B includes a complementary metal oxide semiconductor (CMOS) sensor 712 (illustrated in FIG. 6, description thereof is deferred) or the like and normally captures an image with the CMOS sensor 712. In addition, the communication terminal 10B can obtain a spherical image from the imaging device 5 via wireless communication such as Wireless Fidelity (Wi-Fi) and Bluetooth (registered trademark).

In each of the communication tell finals 10A and 10B, OpenGL ES is installed, and the communication terminals 10A and 10B can generate an area image from a spherical image or an area image from a spherical image transmitted from another communication terminal. Therefore, each of the communication terminals 10A and 10B can display the area image extracted from the spherical image.

At least one customer 102 is at the site A. The communication terminal 10A displays, on the display 720, the image (spherical image, or hemispherical image) captured by the imaging device 5 and the video captured by the imaging device 4. The customer 102 at the site A is a user who views the hemispherical image, or the spherical image switched by the real estate agent 101. However, the number of the customers 102 is not limited to one.

At least one real estate agent 101 is at the site B and carries the imaging device 5 with a hand or a bar to which the imaging device 5 is attached. The real estate agent 101 can move together with the imaging device 5. The real estate agent 101 is a photographer who captures images of the real estate property 110. In addition, the communication terminal 10B displays videos captured by the imaging devices 4 and 5 on the display 720. However, the number of the real estate agents 101 is also not limited to one.

A communication management system 70 manages and controls communication between the communication terminals 10A and 10B. In other words, the communication management system 70 is a communication control system. The communication management system 70 is installed at a data center or a cloud-based communication service. In one example, the communication management system 70 is constructed of a single computer. In another example, the communication management system 70 are divided into a plurality of units (functions, means, or storages) and is constructed of a plurality of computers to which one or more units are allocated.

The number of sites, the types of communication terminals 10A and 10B installed at the sites, the types of imaging devices 4 and 5, and the number of users (customers and real estate agents) illustrated in FIG. 3B are examples. The present embodiment concerns communication between the site A and the other site, but the image communication system 100 can support communicate among three or more sites. The site A does not need the imaging device 4, and displaying the spherical image transmitted from the site B is sufficient for the site A.

Figure 4:
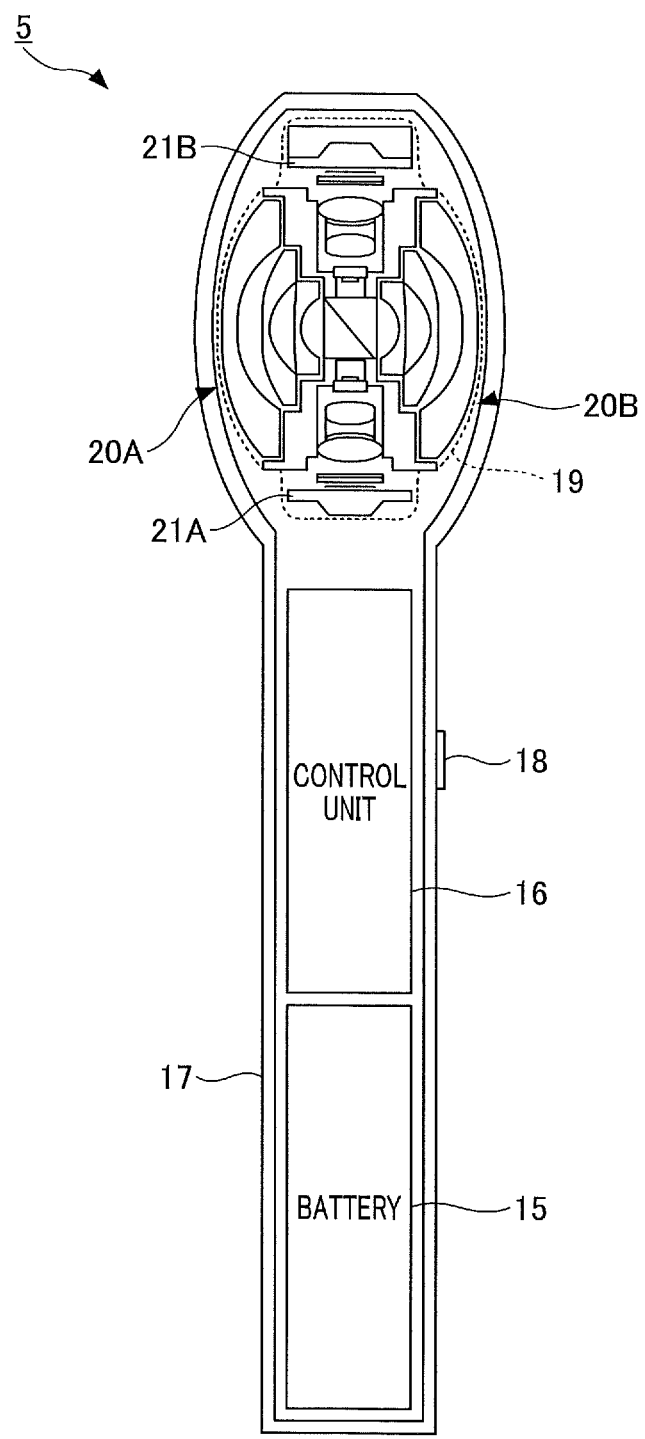
FIG. 4 is a cross-sectional view illustrating an example of an imaging device of the image communication system.

Hereinafter, a general arrangement of the imaging device 5 according to the present embodiment is described with reference to FIGS. 4 and 5. FIG. 4 is a cross-sectional view of the imaging device 5 according to the present embodiment. The imaging device 5 illustrated in FIG. 4 includes an image capturing body 19, a housing 17, and an imaging button 18 on the housing 17. The housing 17 holds components such as a control unit 16 and a battery 15 in addition to the image capturing body 19.

The image capturing body 19 illustrated in FIG. 4 includes two image forming optical systems 20A and 20B, and image sensors 21A and 21B. Each of the image sensors 21A and 21B (an example of a first imaging element and an example of a second imaging element, respectively) is a charge-coupled device (CCD) sensor, a CMOS sensor, or the like. Each of the image forming optical systems 20A and 20B is configured as, for example, seven fisheye lenses in six groups. In the embodiment illustrated in FIG. 4, the above-mentioned fisheye lens has an angle of view greater than 180 degrees (=360 degrees/n, where n denotes the number of optical systems and is 2), and preferably has an angle of view of 190 degrees or greater. A combination of one of such wide-angle image forming optical systems 20A and 20B and one of the image sensors 21A and 21B is referred to as a wide-angle image capturing optical system.

The positions of the optical elements (lenses, prisms, filters, and aperture stops) of the two image forming optical systems 20A and 20B are determined with reference to the image sensors 21A and 21B. More specifically, the optical element is positioned to satisfy: 1) the optical axis of the optical element of each of the image forming optical systems 20A and 20B falls in, at right angles, a center portion of the light receiving area of corresponding one of the image sensors 21A and 21B; and 2) the light receiving area provides the image-forming plane of the corresponding fisheye lens.

In the embodiment illustrated in FIG. 4, the image forming optical systems 20A and 20B have the same configuration. The image forming optical systems 20A and 20B orienting in the opposite directions are combined with each other, with the optical axes thereof matching with each other. The image sensors 21A and 21B convert the received light distribution into image signals, and sequentially output image frames to the control unit 16. The respective images captured by the image sensors 21A and 21B are combined to generate an image over a solid angle of 4π steradian, which is hereinafter referred to as "360-degree image" or "spherical image." The spherical image (360-degree image) is obtained by photographing all the directions viewable from an image capturing location. Although the description below proceeds on the assumption that a spherical image is generated, the image generated can be a so-called panoramic image obtained by photographing 360 degrees only in a horizontal plane or an image by capturing a portion of spherical scene or 360 degrees in a horizontal plane. The spherical image can be stored as a still image or as motion videos.

Figure 5:
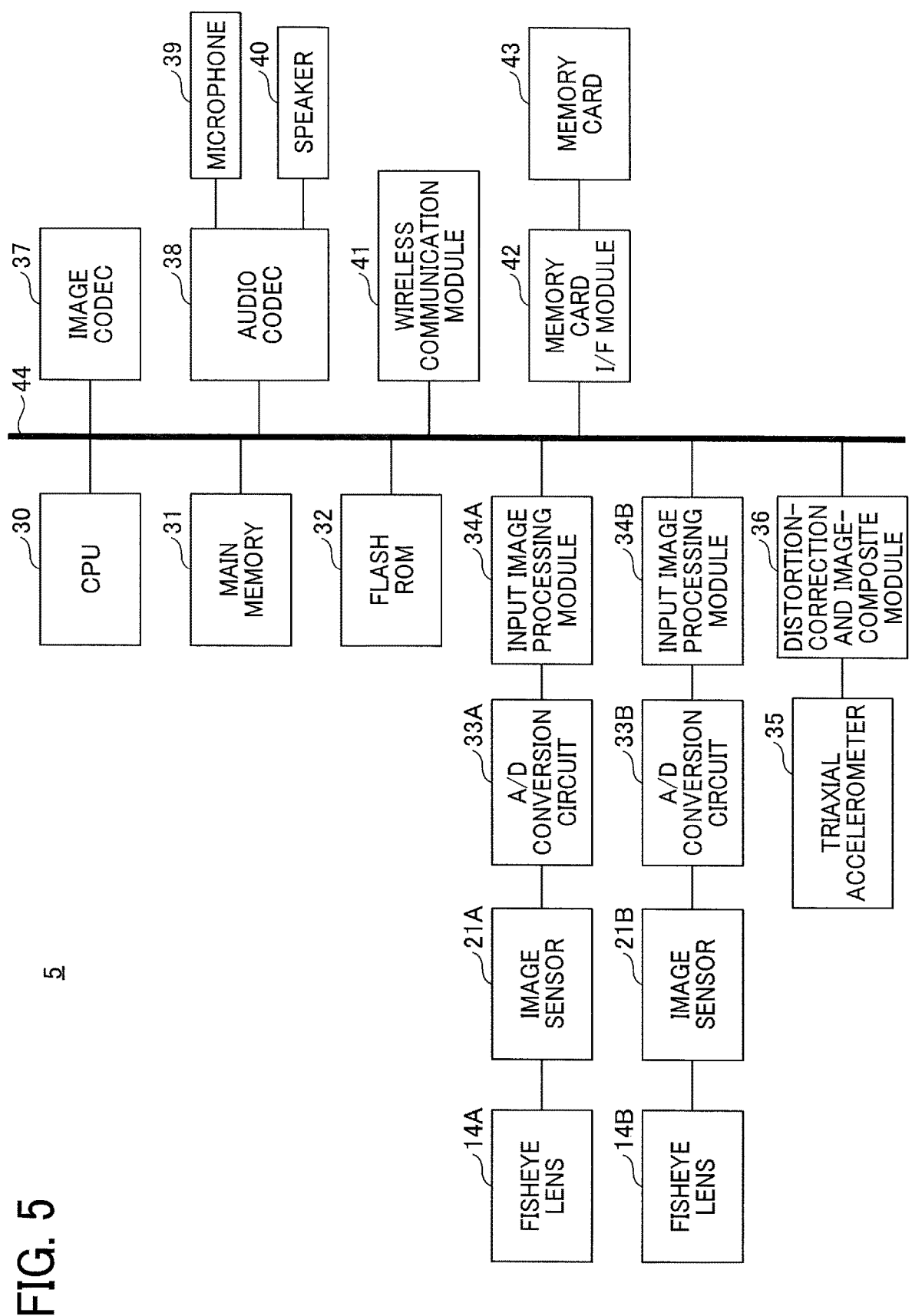
FIG. 5 is a block diagram illustrating an example of a hardware configuration of the imaging device.

FIG. 5 is a block diagram illustrating an example of a hardware configuration of the imaging device 5. The imaging device 5 includes a central processing unit (CPU) 30, a main memory 31, a flash read only memory (ROM) 32, fisheye lenses 14A and 14B, the image sensors 21A and 21B, analog-to-digital (A/D) conversion circuits 33A and 33B, input image processing modules 34A and 34B, a triaxial accelerometer 35, and a distortion-correction and image-composite module 36. The imaging device 5 further includes an image codec 37, an audio codec 38, a microphone 39, a speaker 40, a wireless communication module 41, a memory card interface (I/F) module 42, and a memory card 43.

The CPU 30 loads the program stored in the flash ROM 32 into the main memory 31 and executes the program to control the entire imaging device 5. The main memory 31 is, for example, a dynamic random access memory (DRAM), and is used as a work area of the CPU 30. The flash ROM 32 stores various programs for starting up the system when the power is turned on and implementing the functions of the imaging device 5.

The image codec 37 compresses image data. The audio codec 38 compresses the audio data collected by the microphone, expands the audio data input from the wireless communication module 41, and outputs the audio data from the speaker 40.

The wireless communication module 41 connects to a cellular network and wirelessly transmits and receives video, audio, and the like. The memory card I/F module 42 writes data to the mounted memory card 43 and reads data from the memory card 43.

Analog image signals output from the image sensors 21A and 21B are converted into digital image data by the A/D conversion circuits 33A and 33B and input to the input image processing modules 34A and 34B.

The input image processing modules 34A and 34B measure light using the brightness information of the image data, perform automatic exposure (AE), that is, adjust the exposure, and adjust white balance. In white balance adjustment, red, green, and blue (RGB) ratio is adjusted to improve color reproducibility. The image data subjected to such processes is input to the distortion-correction and image-composite module 36.

Using the information from the triaxial accelerometer 35, the distortion-correction and image-composite module 36 combines the two image data with distortion correction and top-bottom correction to composite a spherical image. The spherical image data is compressed by the image codec 37 and transmitted to the communication terminal 10A in the real estate office 120 via wireless communication (e.g., a cellular network). The audio signal collected by the microphone 39 is also transmitted to the communication terminal 10A in the real estate office 120 via wireless communication (e.g., a cellular network).

Figure 6:
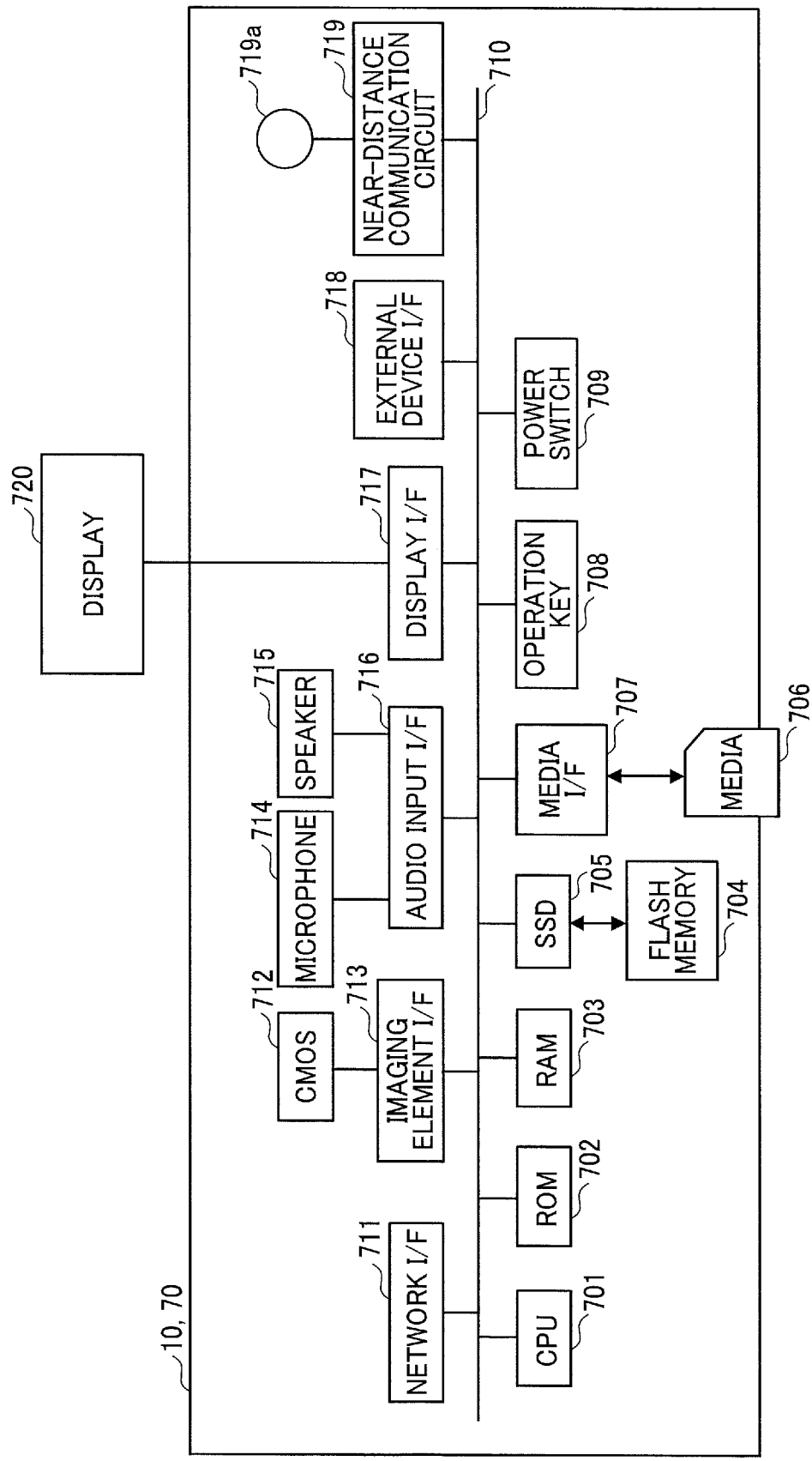
FIG. 6 is a block diagram illustrating an example of a hardware configuration of a communication terminal of the image communication system.

FIG. 6 is a block diagram illustrating a hardware configuration of the communication terminal 10. As illustrated in FIG. 6, the communication terminal 10 includes a CPU 701, a ROM 702, a random access memory (RAM) 703, a flash memory 704, a solid state drive (SSD) 705, a media I/F 707, an operation key 708, a power switch 709, a bus line 710, a network I/F 711, a CMOS sensor 712, an image sensor I/F 713, a microphone 714, a speaker 715, an audio input/output I/F 716, a display I/F 717, an external device I/F 718, a short-range communication circuit 719, and an antenna 719a for the short-range communication circuit 719.

The CPU 701 controls entire operation of the communication terminal 10. The ROM 702 stores a control program for starting an operating system (OS) such as an initial program loader (IPL). The RAM 703 is used as a work area of the CPU 701. The flash memory 704 stores various data such as a communication program, image data, and audio data. The SSD 705 controls reading or writing of various data from and to the flash memory 704 under control of the CPU 701. Instead of the SSD, a hard disk drive (HDD) can be used. The media I/F 707 controls reading or writing of data from and to a recording medium 706 such as a flash memory. The operation key 708 is operated by a user to input a user instruction such as a selection of a destination of communication with the communication terminal 10. The power switch 709 turns on or off the power of the communication terminal 10.

The network I/F 711 is an interface for data communication via the communication network N such as the Internet. The CMOS sensor 712 is an example of a built-in imaging device capable of capturing an object under control of the CPU 701. Note that an imaging unit such as a CCD sensor can be used instead of the CMOS sensor. The image sensor I/F 713 is a circuit that controls drive of the CMOS sensor 712. The microphone 714 is a built-in device that converts sound into electric signals. The speaker 715 is a built-in device that converts electric signals to physical vibrations, thereby generating sound such as music or voice. The audio input/output I/F 716 is a circuit for inputting or outputting an audio signal between the microphone 714 and the speaker 715 under control of the CPU 701. The display I/F 717 is a circuit for transmitting image data to an external display under control of the CPU 701. The external device I/F 718 is an interface for connection with various external devices. The short-range communication circuit 719 is a communication circuit in compliance with the near field communication (NFC), the Bluetooth (Registered Trademark), and the like.

The bus line 710 is an address bus or a data bus for electrical connection with various elements such as the CPU 701 in FIG. 6.

The display 720 is an example of a display that displays an image of a subject, an operation icon, or the like. The display 720 is, for example, a liquid crystal display or an organic electroluminescence (EL) display. The display 720 is connected to the display I/F 717 via a cable. The cable can be a cable for analog red green blue (RGB) (video graphic array (VGA)) signal, a cable for component video, a cable for a high-definition multimedia interface (HDMI) (registered trademark) signal, or a cable for digital video interactive (DVI) signal.

The CMOS sensor 712 is an example of a built-in imaging device capable of capturing an image of a subject under control of the CPU 701. Note that an imaging unit such as a CCD sensor can be used instead of the CMOS sensor. The external device I/F 718 is capable of connecting to an external device such as an external camera, an external microphone, or an external speaker through a universal serial bus (USB) cable or the like. In the case where an external camera is connected to the external device I/F 718, the external camera is given a priority to the built-in CMOS sensor 712 and driven under control of the CPU 701. Similarly, in the case where an external microphone is connected or an external speaker is connected, the external microphone or the external speaker is given priority to the built-in microphone 714 or the built-in speaker 715 and driven under control of the CPU 701.

The recording medium 706 is removably connected to the communication terminal 10. The recording medium 706 can be any non-volatile memory that reads or writes data under control of the CPU 701. The recording medium 706 is not limited to the flash memory 704 but can be, for example, an electrically erasable programmable read-only memory (EE-PROM).

Generation of Spherical Image

Figure 7:
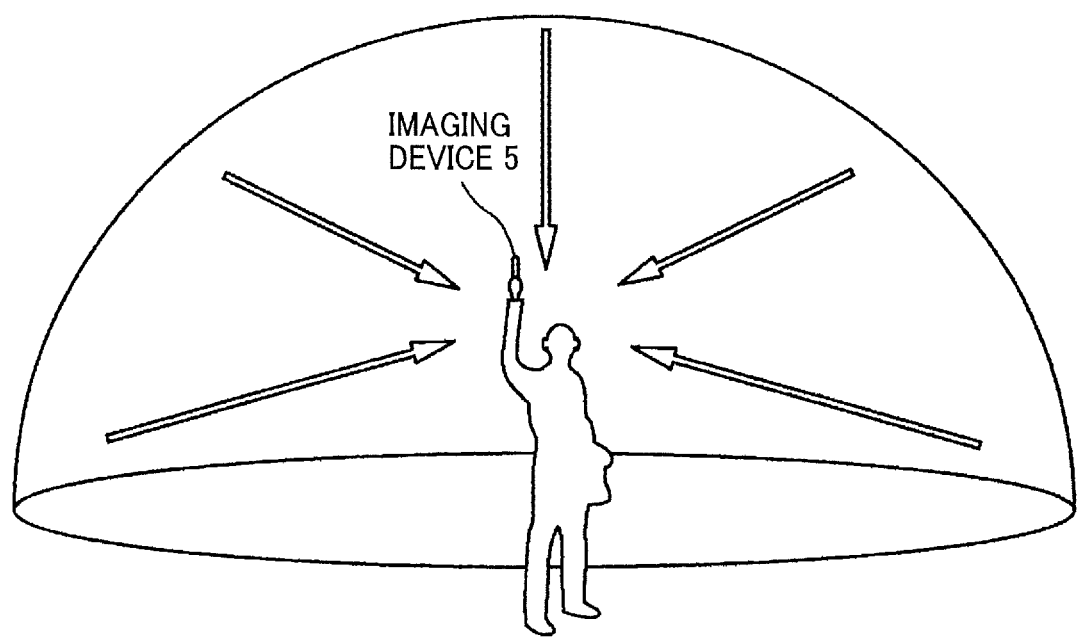
FIG. 7 is an illustration of an example of how the imaging device is used.

A description is given of a method of generating a spherical image with reference to FIGS. 7 to 9B. FIG. 7 illustrates an example of how a user uses the imaging device 5. As illustrated in FIG. 7, for example, the user (the real estate agent in the present embodiment) uses the hand-held imaging device 5 to capture the surroundings of the user. The image sensors 21A and 21B illustrated in FIG. 4 capture images of the surroundings of the user to obtain two hemispherical images.

Figure 8A:
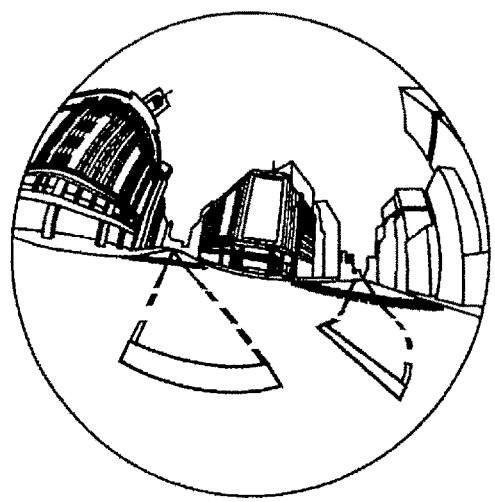
FIGS. 8A and 8B are images captured by the imaging device.

With reference to FIGS. 8A to 9B, a description is given of an outline of processing to generate a spherical image from the images captured by the imaging device 5. FIG. 8A is a hemispherical image (on the front side) captured by the imaging device 5. FIG. 8B is a hemispherical image (on the rear side) captured by the imaging device 5. FIG. 8C is an illustration of an image created by equirectangular projection. Hereinafter, the image represented by equirectangular projection is referred to as "equirectangular projection image" or "equidistant cylindrical projection image." FIG. 9A is an illustration of the concept of mapping the equirectangular projection image onto a surface of a sphere. FIG. 9B illustrates a spherical image CE generated from the images captured by the imaging device 5.

Figure 8B:
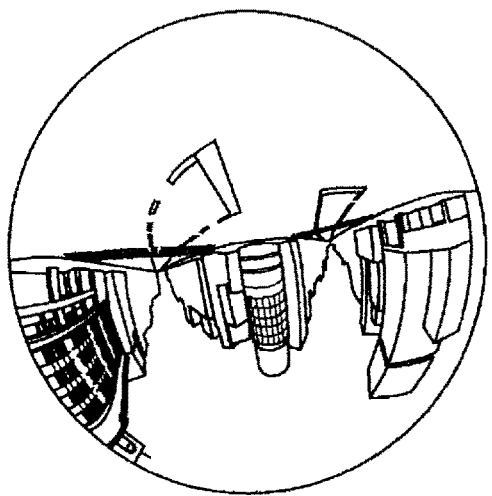
Figure 8C:
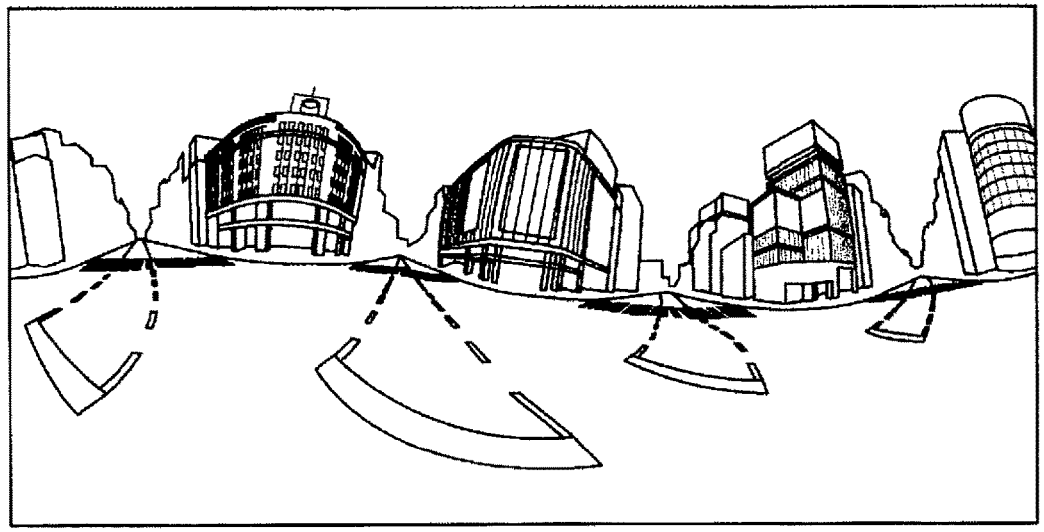
FIG. 8C is an illustration of an image generated from the images illustrated in FIGS. 8A and 8B by equirectangular projection.

As illustrated in FIG. 8A, an image captured by the image sensor 21A is a curved hemispherical image (on the front side) taken through the fisheye lens 14A. Similarly, as illustrated in FIG. 8B, an image captured by the image sensor 21B is a curved hemispherical image (on the rear side) taken through the fisheye lens 14B. The imaging device 5 combines the front-side hemispherical image and the rear-side hemispherical image, which is reversed by 180 degrees from the front-side hemispherical image, and generates the equirectangular projection image as illustrated in FIG. 8C.

The communication terminal 10 uses OpenGL ES to map the equirectangular projection image onto the sphere surface as illustrated in FIG. 9A to generate the spherical image CE illustrated in FIG. 9B. In other words, the spherical image CE is represented as the equirectangular projection image facing a center of a sphere CS (see FIG. 10.) OpenGL ES is a graphic library used for visualizing two-dimensional (2D) and three-dimensional (3D) data. The spherical image CE is either a still image or a motion video.

Since the spherical image CE is an image mapped to cover the sphere surface, the spherical image CE may look strange to the human eye. To avoid imparting such strangeness, a portion of the spherical image CE is displayed as a flat image having fewer curves, which is hereinafter referred to as a "viewable area image."

Figure 10:
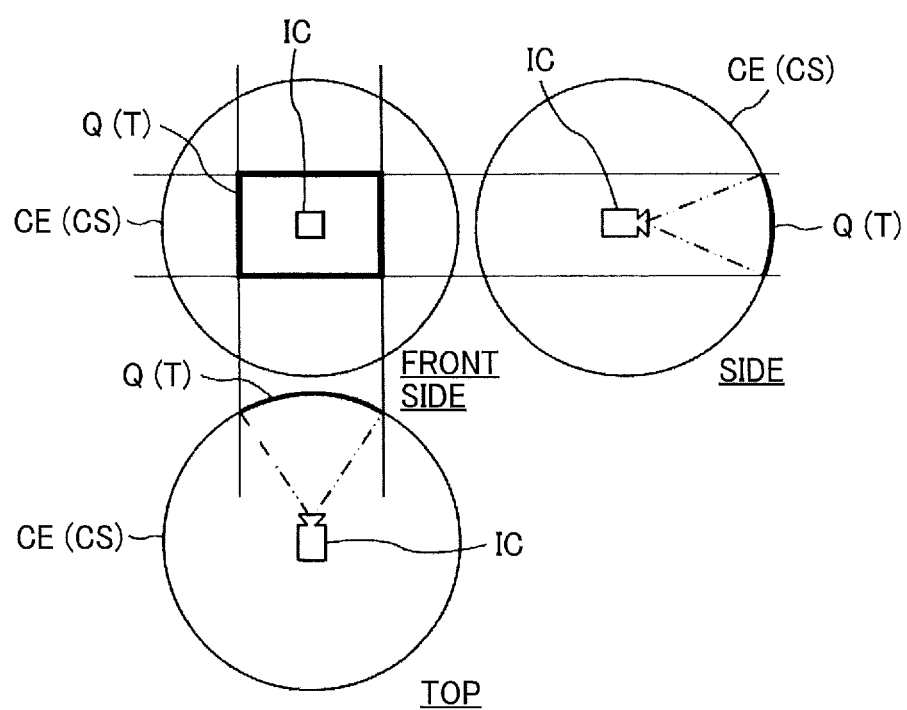
FIG. 10 is an illustration of relative positions of a virtual camera and a predetermined area in a case where a spherical image is mapped on a surface area of a three-dimensional sphere.

FIG. 10 is an illustration of relative positions of a virtual camera integrated circuit (IC) and a predetermined area in a case where the spherical image CE is represented as a surface area of a three-dimensional sphere CS. The virtual camera IC corresponds to a point of view of a user who is viewing the spherical image CE presented as the surface area of the three-dimensional sphere CS.

As illustrated in FIG. 10, the virtual camera IC is located inside the spherical image CE. A viewable area T in the spherical image CE is an imaging area of the virtual camera IC. The zooming of the viewable area T is implemented by expanding or contracting a range (arc) of the angle of view. The zooming of the viewable area T can also be implemented by bringing the virtual camera IC closer to or away from the spherical image CE. A viewable area image Q is an image of the viewable area T in the spherical image CE.

Figure 11:
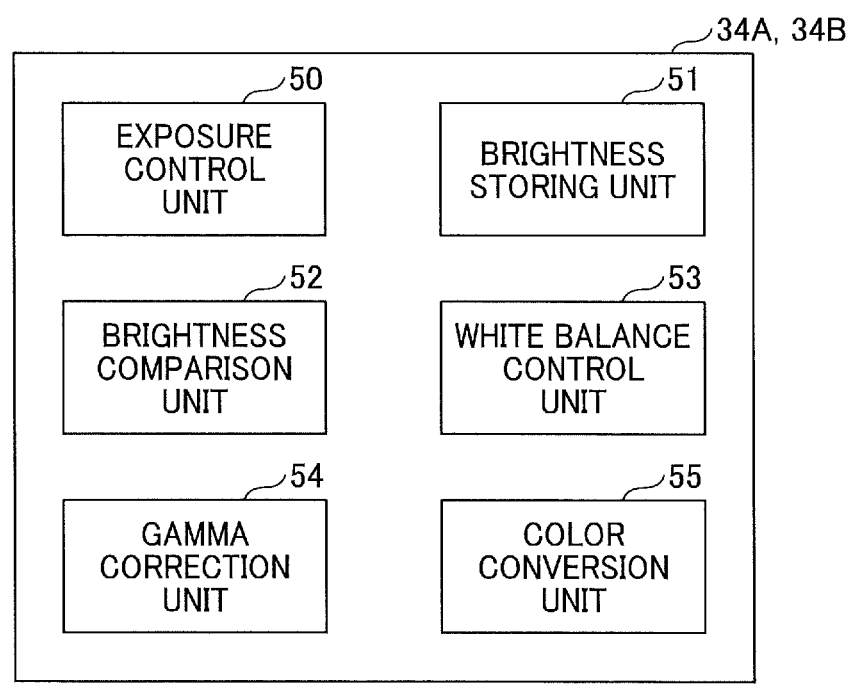
FIG. 11 is a block diagram illustrating an example of a functional configuration of an input image processing module.

Referring to FIG. 11, a description is given of functions of the input image processing modules 34A and 34B.

FIG. 11 is a block diagram illustrating an example of functions of the input image processing modules 34A and 34B. The functions of the input image processing modules 34A and 34B (hereinafter also collectively "input image processing modules 34") are assumed to be the same, but there can be a function that exists in only one of the input image processing modules 34.

Each of the input image processing modules 34 includes an exposure control unit 50, a brightness storing unit 51, a brightness comparison unit 52, a white balance control unit 53, a gamma correction unit 54, and a color conversion unit 55. The exposure control unit 50 performs photometry using the brightness information of the image data output from the image sensor 21A or 21B and subjected to A/D conversion, adjusts the exposure amount, and executes switching between a spherical image and hemispherical image.

The brightness storing unit 51 temporarily stores the brightness value obtained by the exposure control unit 50 for comparison with image data of later time. The brightness comparison unit 52 compares the average brightness of one frame or a plurality of frames obtained by the exposure control unit 50 with the average brightness of one frame or a plurality of frames stored in the brightness storing unit 51.

The white balance control unit 53 equalizes the ratio of RGB in order to improve color reproducibility. The gamma correction unit 54 adjusts the hue of the entire image of one frame. The color conversion unit 55 converts the RGB digital image data to color difference components (Cb and Cr) and a brightness component (Y).

A description is given of processing for a case where the amount of light input from the fisheye lenses 14A and 14B (also collectively "fisheye lenses 14") changes, and the average brightness of all the image data of one frame input to the input image processing modules 34A and 34B (also collectively "input image processing modules 34") differs significantly from the average brightness of all the image data of the previous frame. The exposure control unit 50 of the input image processing module 34 calculates an average of the brightness component values of all the input image data of one frame, and stores the average brightness in the brightness storing unit 51. The brightness comparison unit 52 compares the average brightness of one frame obtained by the exposure control unit 50 with the average brightness of the previous frame stored in the brightness storing unit 51. When the difference in average brightness between the frames is equal to or greater than a threshold (first threshold) and the average brightness of the current frame is equal to or smaller than a threshold (second threshold), the input image processing module 34 outputs a low brightness signal to the distortion-correction and image-composite module 36.

When the difference in average brightness is equal to or greater than the threshold and the average brightness of the current frame is equal to or greater than the threshold, the input image processing module 34 outputs a high brightness signal to the distortion-correction and image-composite module 36. Note that the exposure control unit 50 processes, with 8 bits, the brightness component value per pixel of the image data, and uses a value in the range of from 16, which is the value of black, to 235, which is the value of white, out of the range (0 to 255) represented by 8 bits.

A description is given below of an example how the real estate agent 101 uses the imaging device 5.

Figure 12:
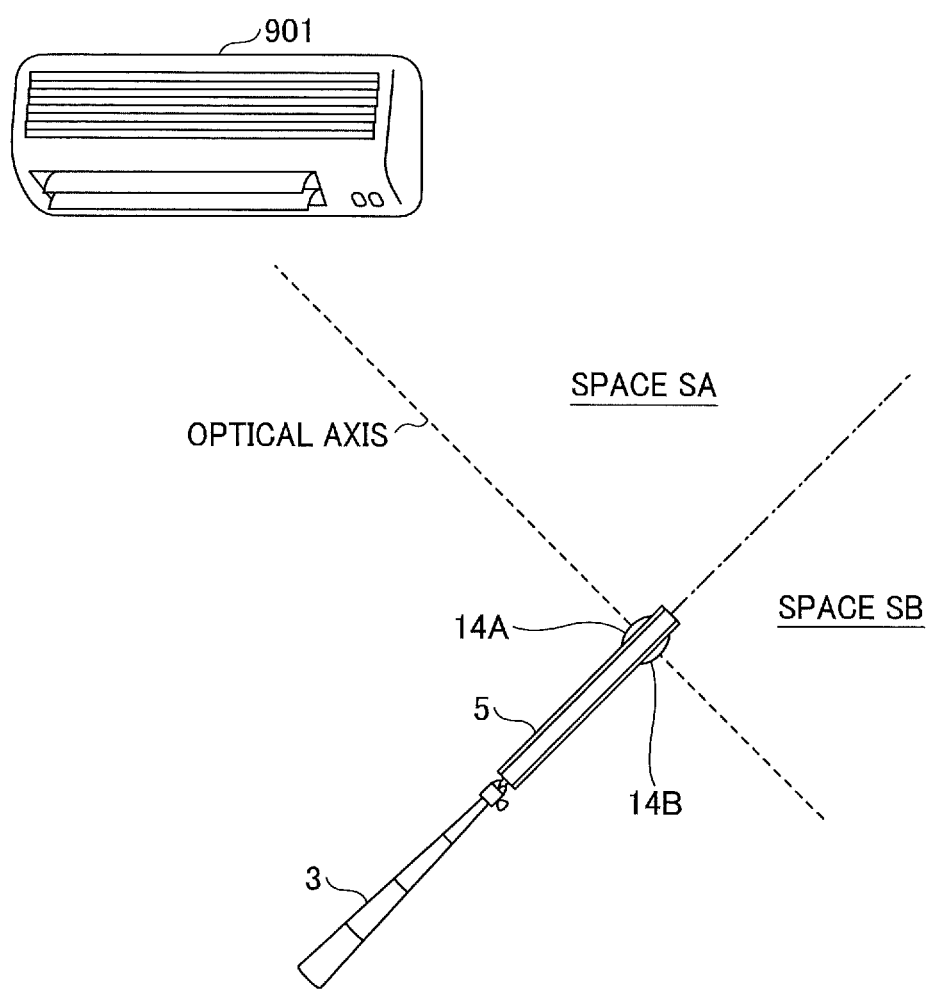
FIG. 12 illustrates an example of a space where the imaging device captures an image.

Specifically, with reference to FIG. 12, a description is given of the operation of the real estate agent 101 and the processing by the imaging device 5 in switching from the spherical image to the hemispherical image. FIG. 12 illustrates an example of a space in which the imaging device 5 captures an image.

The real estate agent 101 showing the real estate property holds a monopod 3 to which the imaging device 5 is attached. The real estate agent 101 orally describes the room to the customer 102 at the real estate office while taking an image of the room with the imaging device 5. First, the real estate agent 101 transmits a spherical image to let the customer 102 view the entire room (space SA and space SB). When describing the air conditioner 901 installed in the room, the real estate agent 101 needs to explain the position of the air conditioner 901 in the spherical image.

In order to obviate the explanation of the position of the air conditioner 901, the real estate agent 101 switches the spherical image to the hemispherical image, and adjusts the orientation and the inclination of the imaging device 5 so that the air conditioner 901 is near the center of the hemispherical image.

The space captured by the image sensor 21A is referred to as a space SA, and the space captured by the image sensor 21B is referred to a space SB. When the air conditioner 901 is located in the space A, the real estate agent 101 changes the orientation and the inclination of the imaging device 5 so that the optical axis of the fisheye lens 14A is substantially oriented to the air conditioner 901. When the fisheye lens 14B is covered with a hand, the amount of light input from the fisheye lens 14B decreases. The brightness comparison unit 52 of the input image processing module 34B compares the average brightness value of one frame obtained by the exposure control unit 50 with the average brightness value of the previous frame stored in the brightness storing unit 51. In response to a determination that the difference between the average brightness values is equal to or greater than a threshold (for example, 100) and the average brightness value of the current frame is equal to or smaller than a threshold (for example, 40), the input image processing module 34B outputs a low brightness signal to the distortion-correction and image-composite module 36. In response to detection of the low brightness signal, the distortion-correction and image-composite module 36 stops composition of the spherical image. The distortion-correction and image-composite module 36 switches to generation of a hemispherical image from the image data input from the input image processing module 34A (free of the low brightness signal or the brighter one of the input image processing modules). The generation of the hemispherical image includes top-bottom correction and distortion correction. The image codec 37 compresses the hemispherical image according to a compression standard such as Advanced Video Coding (AVC), also referred to as H.264, and the wireless communication module 41 transmits the image data to the communication terminal 10A in the real estate office 120 via the communication network N (cellular network or the like). On the display of the communication terminal 10A, the air conditioner 901 appears near the center of the hemispherical image.

When the real estate agent 101 at the real estate property 110 releases his or her hand from the fisheye lens 14B, the amount of light input from the fisheye lens 14B increases. The brightness comparison unit 52 of the input image processing module 34B compares the average brightness value of one frame obtained by the exposure control unit 50 with the average brightness value of the previous frame stored in the brightness storing unit 51. In response to a determination that the difference between the average brightness values is equal to or greater than a threshold (for example, 100) and the average brightness of the current frame is equal to or greater than a threshold (for example, 140), the input image processing module 34B outputs a high brightness sign to the distortion-correction and image-composite module 36.

In response to detection of the high brightness signal, the distortion-correction and image-composite module 36 restarts the spherical image composite processing. Then, the spherical image is compressed according to H.264, and the wireless communication module 41 transmits the compressed image data to the communication terminal 10A in the real estate office 120 via the communication network N (cellular network or the like).

The description here concerns the use of two image sensors 21. In a case where three or more image sensors 21 are used, in response to a low brightness signal from the input image processing module 34 of one of the image sensors 21, the distortion-correction and image-composite module 36 combines the image data of the other two image sensors 21. The same applies to a case where there are four or more image sensors.

In this manner, switching from a spherical image to an image captured by the image sensor 21A (image of approximately 180 degrees) or to an image captured by the image sensor 21B (image of approximately 180 degrees) is performed by an intuitive action such as covering one fisheye lens 14 with a hand, without using a hardware or software switch. Similarly, switching from an image captured by the image sensor 21A or 21B (image of approximately 180 degrees) to a spherical image is performed by an intuitive action such as releasing the hand from one fisheye lens 14A or 14B, without using a hardware or software switch.

Figure 13:
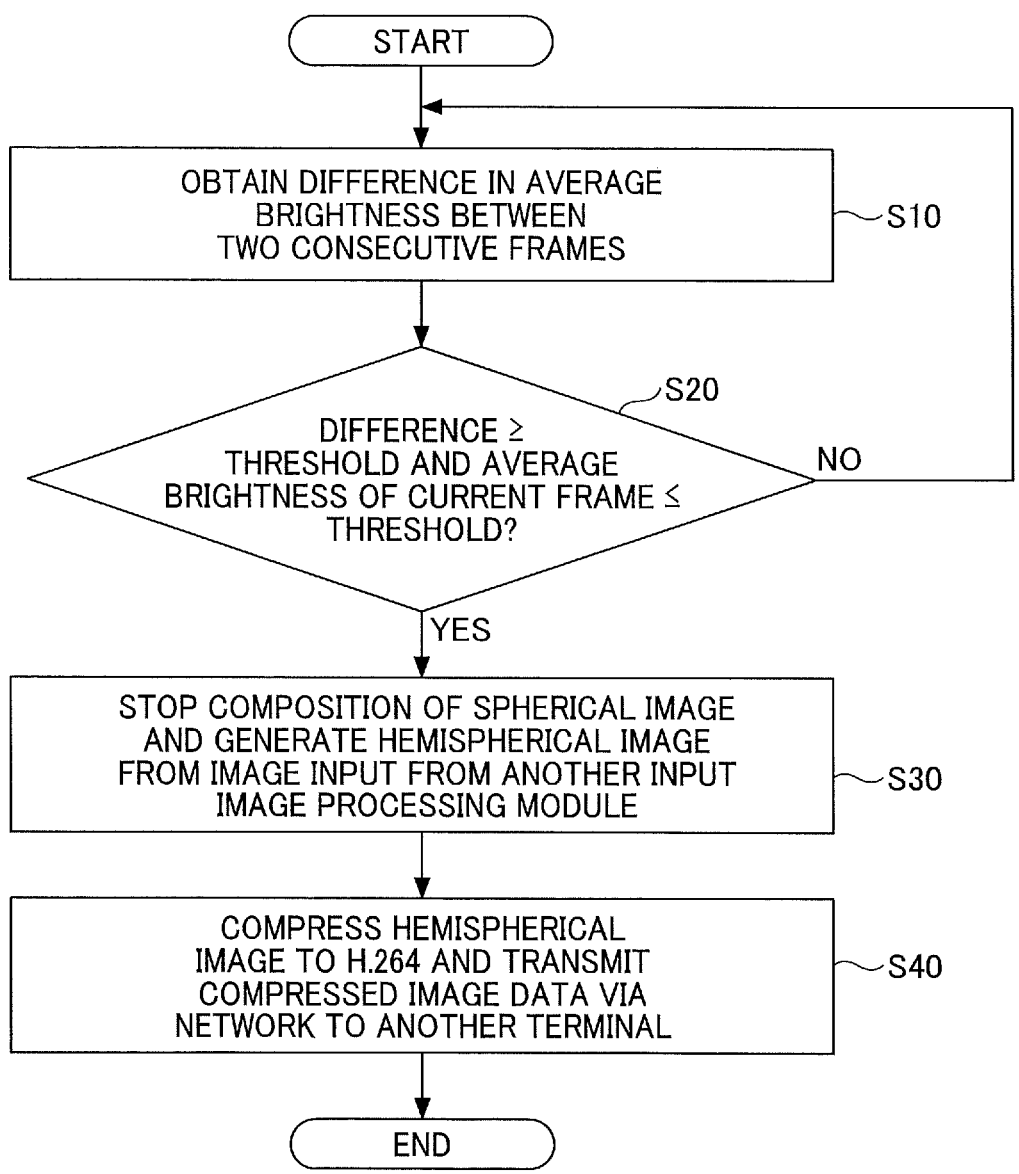
FIG. 13 is a flowchart illustrating an example of switching from a spherical image to a hemispherical image on the imaging device according to Embodiment 1.

FIG. 13 is a flowchart illustrating an example of a process performed by the imaging device 5, for switching from a spherical image to a hemispherical image. The process illustrated in FIG. 13 is repeated while the imaging device 5 generates a spherical image by combining two pieces of image data.

The brightness comparison unit 52 of each of the input image processing modules 34A and 34B compares the average brightness of image data of one frame (an example of first image data) obtained by the exposure control unit 50 with the average brightness of the image data of the previous frame (an example of second image data) stored in the brightness storing unit 51. Thus, the brightness comparison unit 52 obtains the difference in average brightness between two consecutive frames (S10).

Next, the brightness comparison unit 52 determines whether or not the difference between the average brightness values between two consecutive frames is equal to or greater than the threshold and the average brightness value of the current frame is equal to or smaller than the threshold (S20). In response to a determination of "NO" in S20, the process returns to S10.

In response to a determination of "Yes" in S20, the distortion-correction and image-composite module 36 stops the composition of the spherical image, and generates a hemispherical image based on the image input from the other input image processing module 34 of the brighter one (S30).

In S40, the image codec 37 compresses the hemispherical image into H.264 and transmits the compressed image data to the communication terminal 10A via the communication network N.

Figure 14:
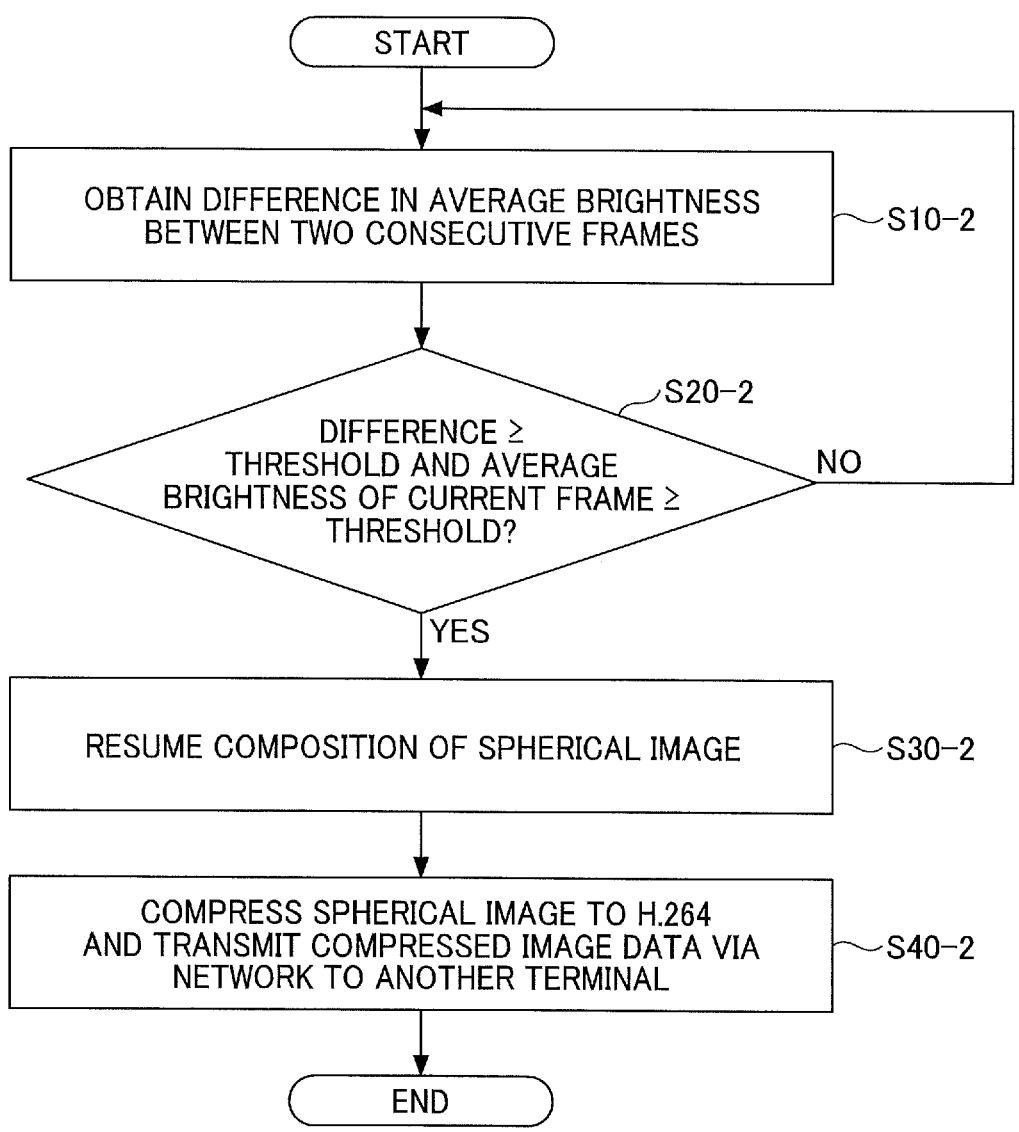
FIG. 14 is a flowchart illustrating an example of switching from a hemispherical image to a spherical image on the imaging device according to Embodiment 1.

FIG. 14 is a flowchart illustrating an example of switching from a hemispherical image to a spherical image on the imaging device 5. In the description referring to FIG. 14, for simplicity only the main differences from FIG. 13 are described. The process illustrated in FIG. 14 is repeated while the imaging device 5 transmits a hemispherical image without combining two image data.

The difference from the processing in FIG. 13 is the determination in S20-2 whether the difference between the average brightness of one frame and the average brightness of the previous frame stored in the brightness storing unit 51 is equal to or greater than a threshold, and the average brightness of the current frame is equal to or greater than a threshold.

In response to the determination of "Yes" in S20-2, the distortion-correction and image-composite module 36 restarts the composition of the spherical image in S30-2.

In S40-2, the image codec 37 compresses the spherical image according to H.264 and transmits the compressed image data to the communication terminal 10A via the communication network N.

As described above, the image communication system 100 according to the present embodiment can execute switching from a spherical image to a hemispherical image, without a hardware or software switch, and with an intuitive action by the user. Therefore, the customer 102 can view the object that the real estate agent 101 wants to present, without description of location of the object by the real estate agent 101.

A description is given below of Embodiment 2.

An imaging device 5 according to Embodiment 2 compares the average brightness values of a plurality of time-series frames, and switches from a spherical image to a hemispherical image upon determining that 1) the difference is equal to or greater than a threshold, and 2) the average brightness of a plurality of temporally later frames is equal to or smaller than a threshold.

The description below assumes that the hardware configuration illustrated in FIG. 5 and the functional configuration illustrated in FIG. 11 in Embodiment 1 adapt to the present embodiment.

Average Brightness of Time-Series Frames

Figure 15:
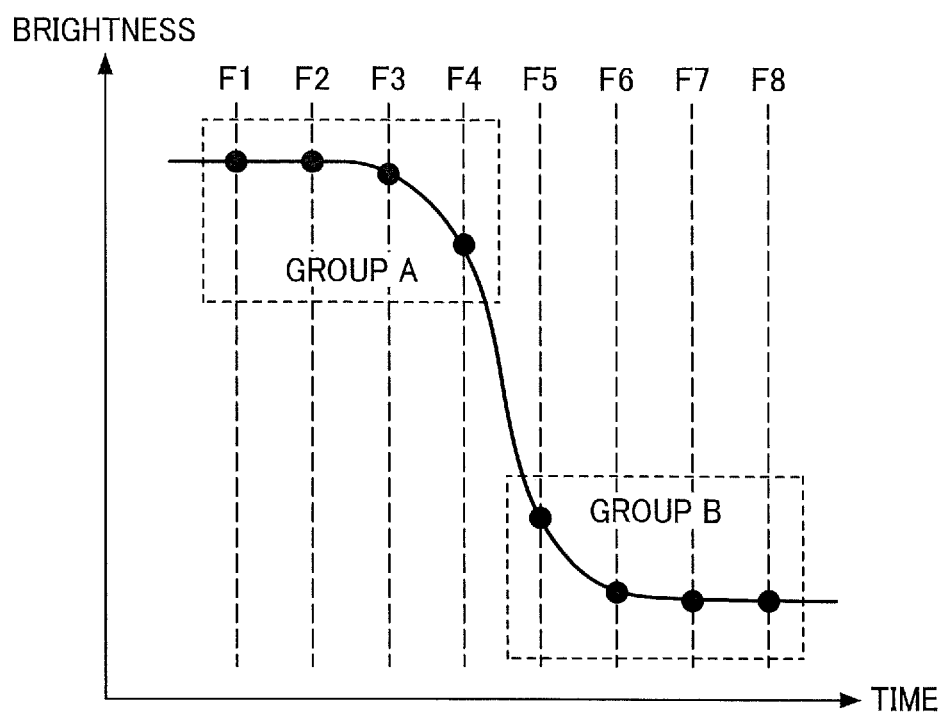
FIG. 15 is a chart illustrating an average brightness in each of a plurality of time-series frames.

FIG. 15 is a graph of average brightness values of a plurality of time-series frames. In FIG. 15, brightness values of a plurality of time-series frames are illustrated. In FIG. 15, F1, F2, . . . represents frame numbers, and black dots indicate average brightness values of image data in each frame. In the case where the frame rate is high, when the fisheye lens is covered with a hand, the brightness value (average value) decreases over a plurality of frames as illustrated in FIG. 15. In other words, there is a possibility that the imaging device 5 fails to detect a change in brightness when focusing on only one frame because the brightness may change gradually and the difference between one frame and another one frame is smaller than the threshold.

Therefore, the exposure control units 50 of each of the input image processing modules 34A and 34B determines the average of the brightness values of the image data of a plurality of frames input during a certain period of time, and store the average brightness value in the brightness storing unit 51. In the present embodiment, for example, eight average brightness values of image data for eight frames are stored in the brightness storing unit 51.

The respective average brightness values of the eight frames stored in the brightness storing unit 51 are divided into values of the first four frames (group A in FIG. 15) and values of the second four frames (group B in FIG. 15). The brightness comparison unit 52 further averages the average brightness values of the first four frames (group A) and averages the average brightness values of the second four frames (group B). Then, the brightness comparison unit 52 compares the average brightness value of the group A with the average brightness value of the group B. When the difference between the average brightness values is equal to or greater than the threshold and the average brightness value of the temporally later group (group B) is equal to or smaller than the threshold, the input image processing modules 34A and 34B outputs a low brightness signal to the distortion-correction and image-composite module 36.

For example, when the fisheye lens 14B is covered with a hand, the amount of light input from the fisheye lens 14B decreases. The brightness comparison unit 52 of the input image processing module 34B compares the average brightness value of the group A with the average brightness value of the group B. In response to a determination that the difference between the average brightness values is equal to or greater than the threshold (for example, 80) and the average brightness value of the temporally later group (group B) is equal to or smaller than the threshold (for example, 50), the input image processing module 34B outputs a low brightness signal to the distortion-correction and image-composite module 36.

In response to detection of the low brightness signal, the distortion-correction and image-composite module 36 stops the composition of the spherical image and switches to generation of a hemispherical image from the image data input from the input image processing module 34A having a brighter brightness value and not outputting the low brightness signal. The generation involves top-bottom correction and distortion correction.

The brightness comparison unit 52 of the input image processing module 34B repeats the comparing of the average brightness value of the group A with the average brightness value of the group B. In response to a determination that the difference between the average brightness values is equal to or greater than the threshold (for example, 80) and the average brightness value of the temporally later group (group B) is equal to or greater than the threshold (for example, 130), the input image processing module 34B outputs the high brightness signal to the distortion-correction and image-composite module 36. In response to detection of the high brightness signal, the distortion-correction and image-composite module 36 restarts the spherical image composite processing.

Figure 16:
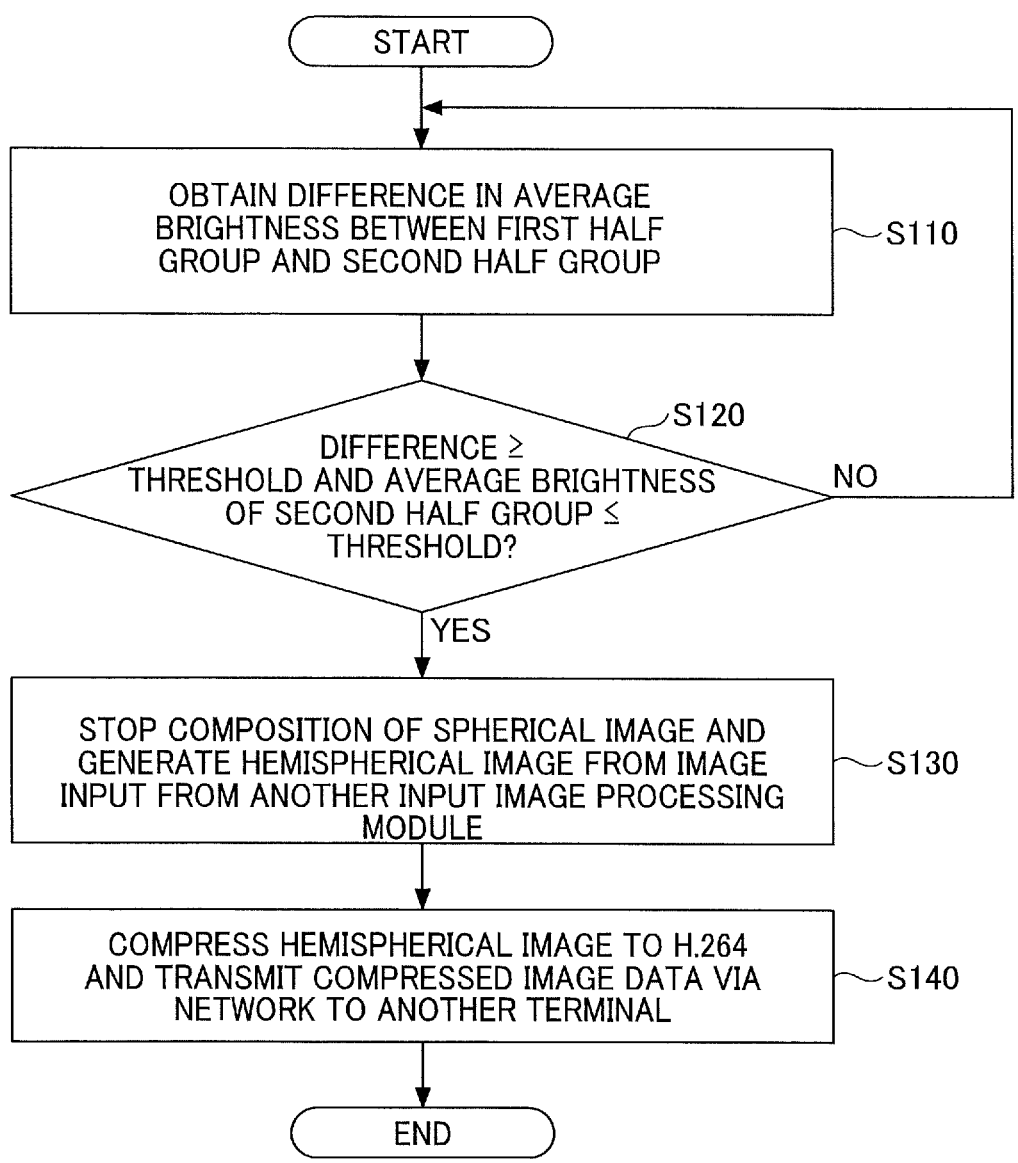
FIG. 16 is a flowchart illustrating an example of switching from a spherical image to a hemispherical image based on brightness values of a plurality of frames, on an imaging device according to Embodiment 2.

FIG. 16 is a flowchart illustrating an example of switching, executed by the imaging device 5, from a spherical image to a hemispherical image, based on the brightness values of a plurality of frames. In the description referring to FIG. 16, for simplicity only the main differences from FIG. 13 are described.

In S110, the brightness comparison unit 52 of each of the input image processing modules 34A and 34B compares the average brightness value of the first half group with the average brightness value of the second half group obtained by the exposure control unit 50.

In S120, the brightness comparison unit 52 determines whether the difference between the average brightness of the first half group and the average brightness of the second half group is equal to or greater than the threshold, and whether the average brightness of the second half group is equal to or smaller than the threshold. The following steps S130 and S140 can be the same as the corresponding steps in FIG. 13.

Figure 17:
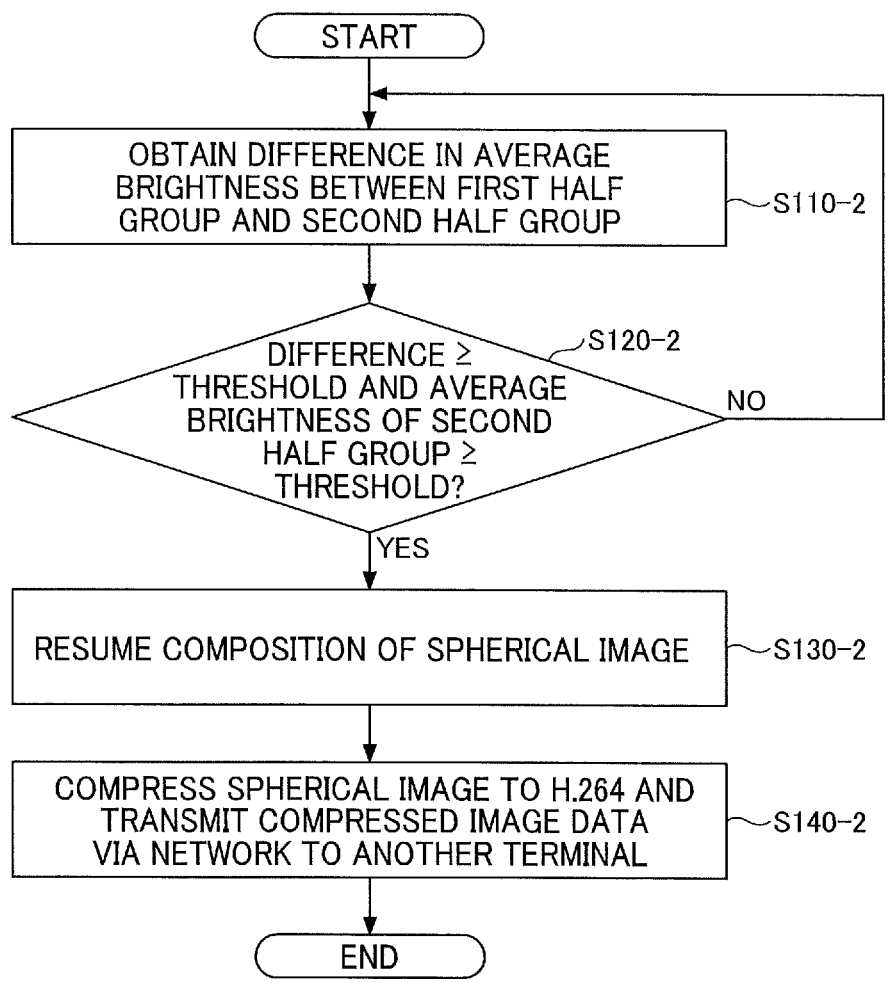
FIG. 17 is a flowchart illustrating an example of switching from a hemispherical image to a spherical image based on brightness values of a plurality of frames, on the imaging device according to Embodiment 2.

FIG. 17 is a flowchart illustrating an example of switching, executed by the imaging device 5, from a hemispherical image to a spherical image based on the brightness values of a plurality of frames. In the description referring to FIG. 17, for simplicity only the main differences from FIG. 14 are described.

In S110-2, the brightness comparison unit 52 of each of the input image processing modules 34A and 34B compares the average brightness value of the first half group with the average brightness value of the second half group obtained by the exposure control unit 50.

In S120-2, the brightness comparison unit 52 determines whether the difference between the average brightness of the first half group and the average brightness of the second half group is equal to or greater than the threshold, and whether the average brightness of the second half group is equal to or greater than the threshold. Subsequent processes in S130-2 and S140-2 can be the same as those in S30-2 and S40-2 in FIG. 14.

According to the present embodiment, in addition to the effects of Embodiment 1, the detection accuracy of the change in brightness can improve when the frame rate of the motion video captured by the imaging device 5 is high.

Embodiment 3 is described below.

In Embodiment 3, the imaging device 5 divides image data of one frame into a plurality of blocks and calculates an average brightness per each block of the image data.

The description below is on the assumes that the hardware configuration illustrated in FIG. 5 and the functional configuration illustrated in FIG. 11 in Embodiment 1 adapt to the present embodiment.

Block Image Data Divided from One Frame

Figure 18:
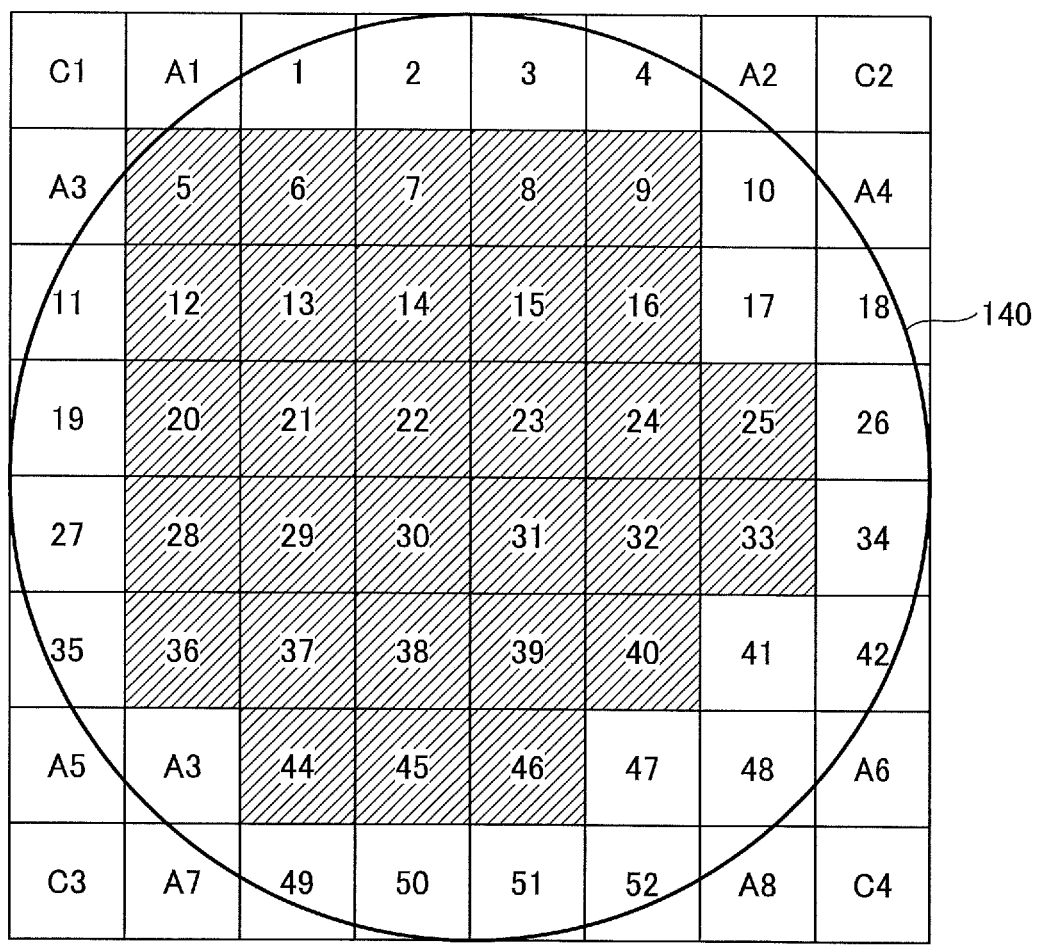
FIG. 18 is a chart illustrating image data of one frame divided into a plurality of blocks.

FIG. 18 is a diagram illustrating image data of one frame divided into a plurality of blocks. The exposure control unit 50 of each of the input image processing modules 34A and 34B divides one frame of input image data into blocks as illustrated in FIG. 18. In FIG. 18, the image data of one frame is divided into 8×8 blocks, but the image data can be divided more finely or grossly. Further, the sizes of blocks can be different.

In FIG. 18, the blocks inside a circle 140 are of the captured image data (area where light reaches), and the blocks C1 to C4 at the four corners are without image data. The amount of captured image data in the blocks A1 to A8 next to C1 to C4 is small, and the necessity to calculate the average brightness thereof is small. In other words, even when the brightness comparison unit 52 compares the brightness values of the blocks A1 to A8, there is no change, and it is difficult to detect a change in the brightness value.

Therefore, the exposure control unit 50 obtains the average brightness value of the image data in each of the blocks numbered from 1 to 52, and stores average brightness values in the brightness storing unit 51, in association with the block numbers.

The brightness comparison unit 52 compares, for each block, the average brightness value of the current frame with the average brightness value of the previous frame stored in the brightness storing unit 51. When the difference between the average brightness values is equal to or greater than the threshold and the average brightness value of the current frame is equal to or smaller than the threshold, the brightness comparison unit 52 sets a low brightness flag associated with that block number to 1. The value of the low brightness flag is also stored in the brightness storing unit 51. The shaded blocks in FIG. 18 are blocks for which the low brightness flag is set to "1." When the number of blocks for which the low brightness flag is 1 is equal to or greater than a threshold (third threshold), for example, 30 or greater, a low brightness signal is output to the distortion-correction and image-composite module 36. In response to detection of the low brightness signal, the distortion-correction and image-composite module 36 stops the composition of the spherical image and switches to generation of a hemispherical image from the image data input from the input image processing module 34A, which involves top-bottom correction and distortion correction.

Then, the brightness comparison unit 52 of the input image processing module 34B repeatedly compares, for each block, the average brightness value of the current frame with the average brightness value of the previous frame stored in the brightness storing unit 51. Regarding all blocks for which the low brightness flag is set to "1," the brightness comparison unit 52 determines whether the difference between the average brightness values is equal to or greater than the threshold (for example, 100) and the average brightness value of the current frame is equal to or greater than the threshold (for example, 140). In response to a determination of Yes, the input image processing module 34B outputs the high brightness signal to the distortion-correction and image-composite module 36. In response to detection of the high brightness signal, the distortion-correction and image-composite module 36 restarts the spherical image composite processing.

Figure 19:
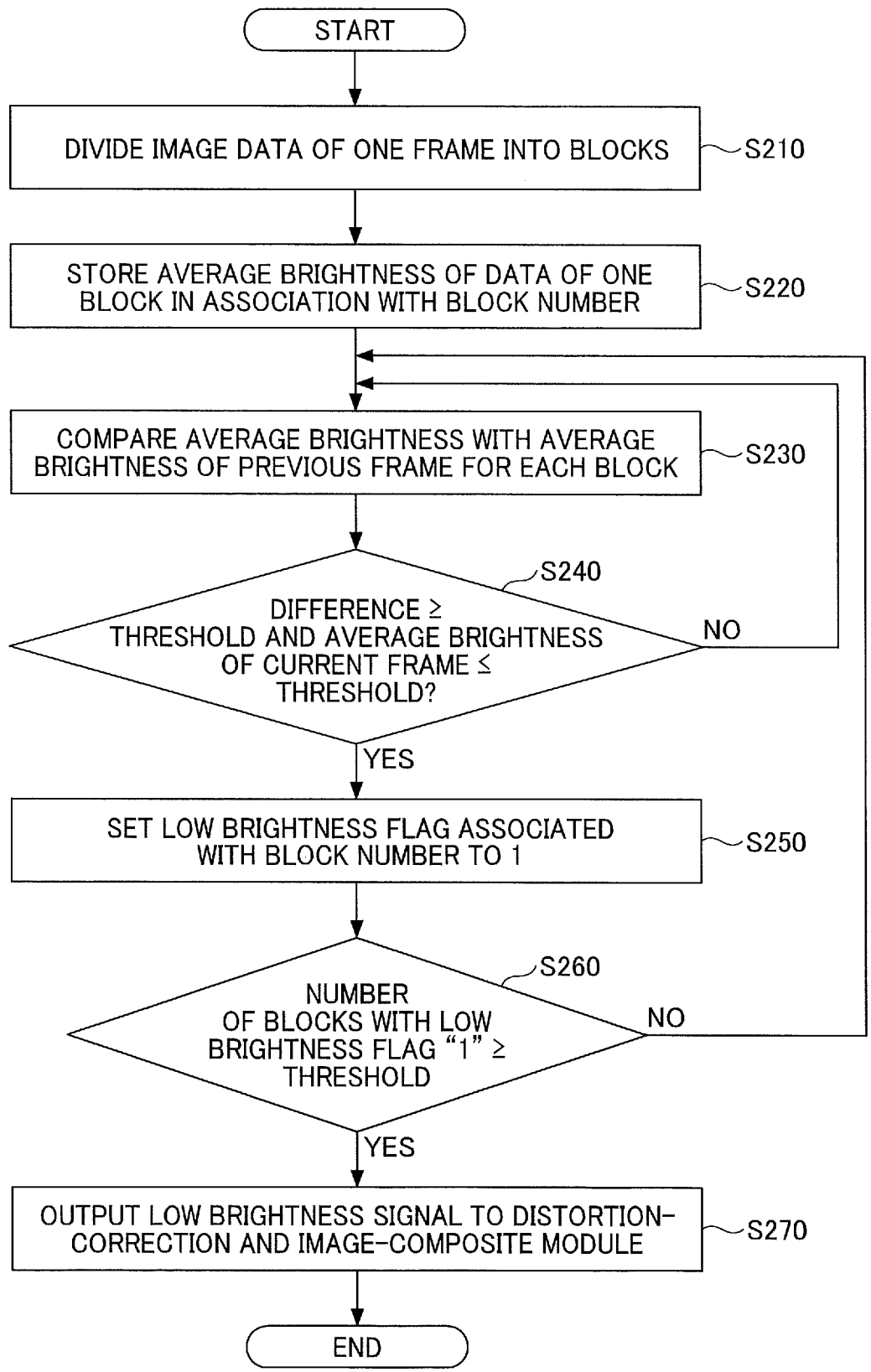
FIG. 19 is a flowchart illustrating an example of a process executed by an imaging device according to Embodiment 3, to divide a frame into blocks and switch from a spherical image to a hemispherical image.

FIG. 19 is a flowchart illustrating an example of switching performed by the imaging device 5 from a spherical image to a hemispherical image, based on division of one frame.

First, the exposure control unit 50 divides image data of one frame into blocks (S210). The number of blocks divided is predetermined and can be stored in a memory, for example, by a manufacturer based on empirical data.

Next, the exposure control unit 50 calculates the average brightness of the image data for each block, and stores the average brightness in the brightness storing unit 51 in association with the block number (S220).

The brightness comparison unit 52 compares, for each block, the average brightness value with the average brightness value of the previous frame (S230). As a result of the comparison, the brightness comparison unit 52 determines, for each block, whether the difference between the brightness values is equal to or greater than the threshold and the average brightness of the block of the current frame is equal to or smaller than the threshold (S240). In response to a determination of "NO" in S240, the process returns to S230.

In response to a determination of "Yes" in S240, the brightness comparison unit 52 sets the low brightness flag corresponding to the block number to 1 (S250).

In S260, the brightness comparison unit 52 determines whether the number of blocks for which the low brightness flag is 1 is equal to or greater than the threshold. In response to a determination of "NO" in S260, the process returns to S230.

In response to the determination of "Yes" in S260, the brightness comparison unit 52 outputs the low brightness signal to the distortion-correction and image-composite module 36 in S270. As a result, the composition of the spherical image is stopped, and the hemispherical image is transmitted.

Figure 20:
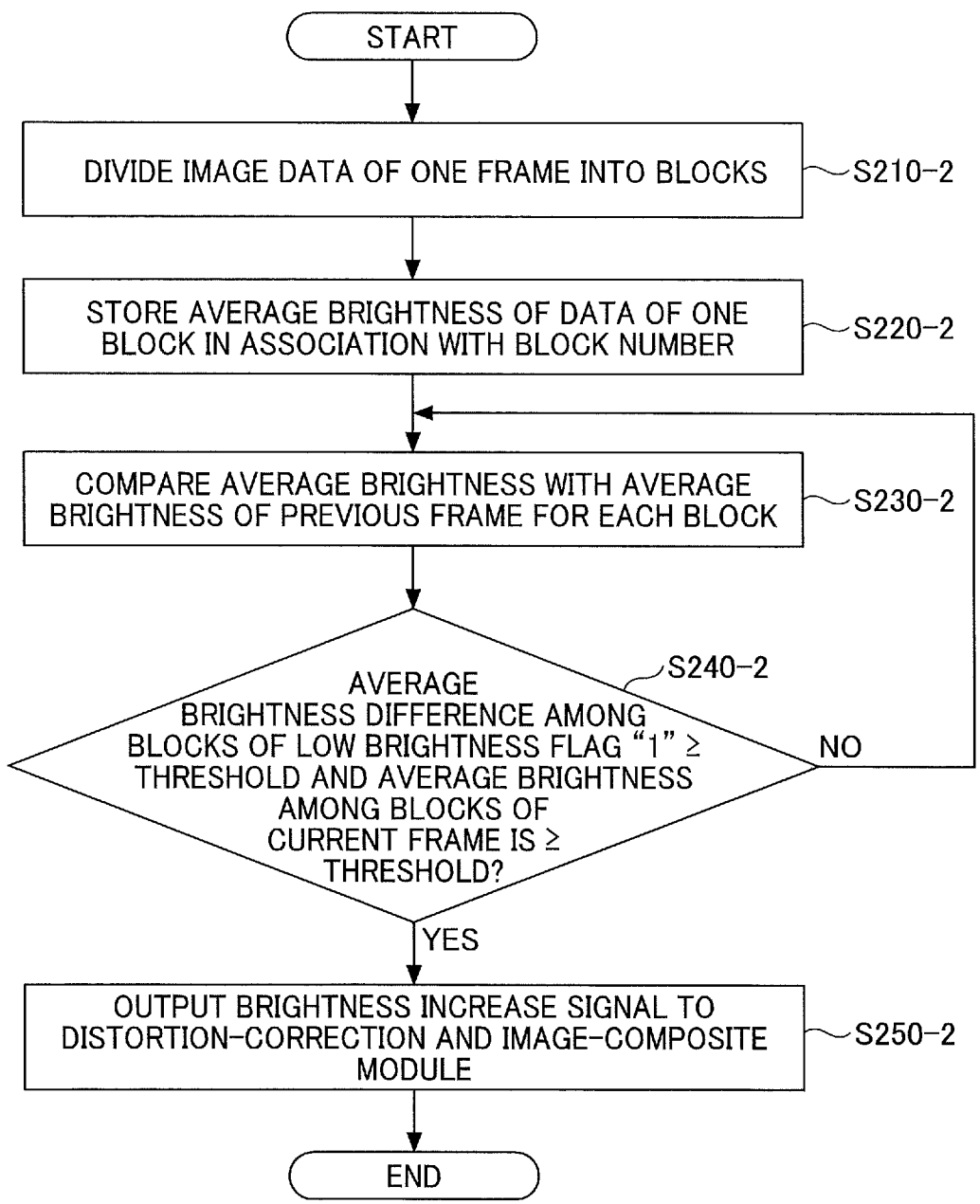
FIG. 20 is a flowchart illustrating an example of a process executed by the imaging device according to Embodiment 3 to divide a frame into blocks and switch from a hemispherical image to a spherical image.

FIG. 20 is a flowchart illustrating an example of a process performed by the imaging device 5, to divide a frame into blocks and switch from a hemispherical image to a spherical image. In the description referring to FIG. 20, for simplicity only the main differences from FIG. 19 are described.

Processing from S210-2 to S230-2 can be the same as those in S210 to S230 in FIG. 19.

In S240-2, regarding all blocks for which the low brightness flag is set to "1," the brightness comparison unit 52 determines, whether the difference between the brightness values is equal to or greater than the threshold and the average brightness of the block of the current frame is equal to or greater than the threshold.

In response to the determination of "Yes" in S240-2, the brightness comparison unit 52 outputs the high brightness signal to the distortion-correction and image-composite module 36 in S250-2. Thus, the composition of the spherical image is restarted.

According to the present embodiment, in addition to the effect of Embodiment 1, when the real estate agent 101 covers one fisheye lens 14 with his or her hand to switch to the hemispherical image, the image can be switched to the hemispherical image even when some of the light is not blocked but enters the fisheye lens 14.

In the present embodiment, the brightness value of each block of the current frame is compared with the brightness value of each block of the temporally previous frame. Alternatively, the brightness value of the block can be compared for each group of a plurality of frames as in Embodiment 3.

Embodiment 4 is described below.

In Embodiment 4, the imaging device 5 captures a still image and detects an image code from a spherical image. The image code signifies a barcode, a two-dimensional barcode, or the like.

Figure 21:
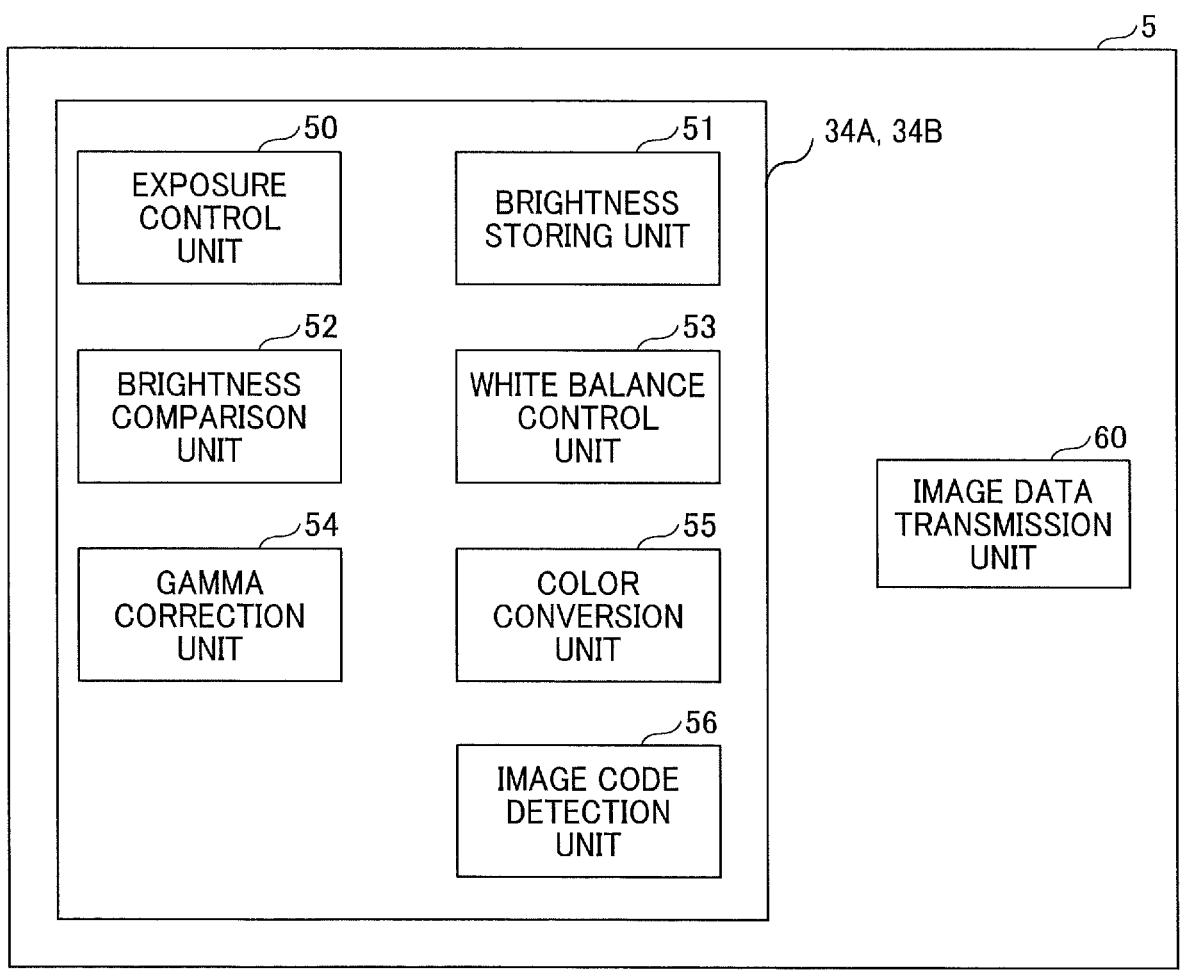
FIG. 21 is a block diagram illustrating a functional configuration of an imaging device according to Embodiment 4.

Referring now to FIG. 21, a description is given of functions of the imaging device 5.

FIG. 21 is a block diagram illustrating a functional configuration of the imaging device 5. Elements of the present embodiment given reference characters that are the same as those in FIG. 11 operate similarly and attain the same effect. Accordingly, only the main elements that differ from those in FIG. 11 are described below.

The input image processing modules 34A and 34B of the present embodiment include an image code detection unit 56. The image code detection unit 56 determines the presence or absence of an image code such as a barcode or a two-dimensional code. When detecting an image code, the image code detection unit 56 decodes the image code and takes out information therefrom.

Further, the imaging device 5 includes an image data transmission unit 60. The image data transmission unit 60 is implemented by the wireless communication module 41 or the like. The image data transmission unit 60 transmits a hemispherical image or a spherical image to a server described later.

Figure 22:
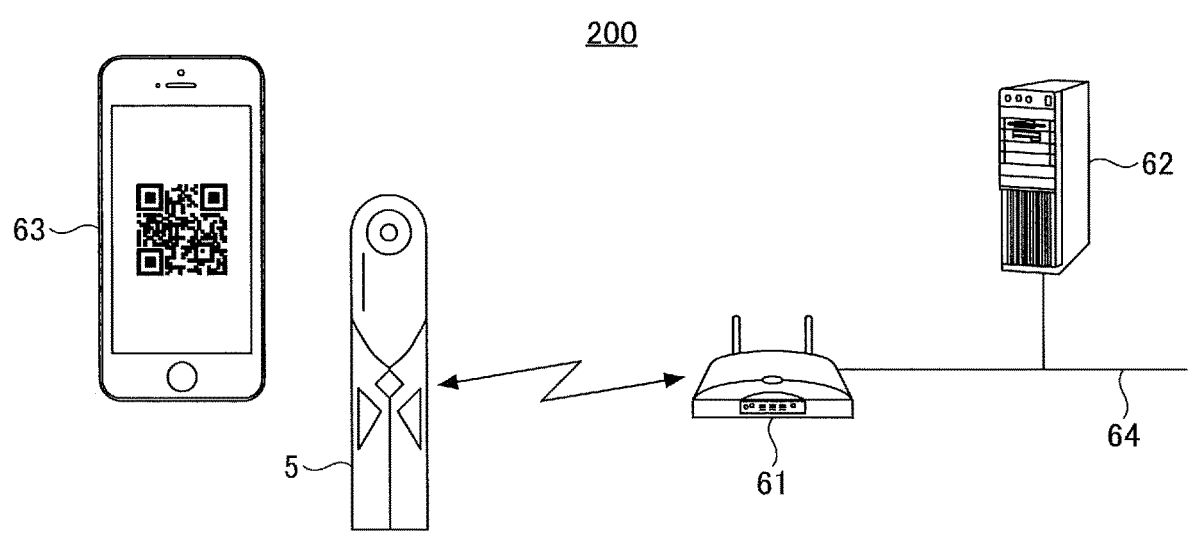
FIG. 22 is a schematic diagram illustrating an example of a configuration of an imaging system, according to an embodiment.

FIG. 22 is a schematic diagram illustrating an example of a configuration of an imaging system 200 according to the present embodiment. The system configuration is different from that of FIG. 3A or FIG. 3B in that, while the viewing system generally handle motion videos, the system according to the present embodiment handles still images.

The wireless communication module 41 of the imaging device 5 connects to a wireless local area network (LAN) access point 61 according to Institute of Electrical and Electronics Engineers (IEEE) 802.11g or the like and performs data communication. The wireless LAN access point 61 performs data communication with a server 62 according to an Ethernet (registered trademark) 64 or the like.

The user (a person who uses the imaging device 5 and is not a real estate agent) wants to transmit image data captured by the imaging device 5 to the server 62. That requires inputting address information, that is, a uniform resource locator (URL), of the server 62 into the imaging device 5 when the information is not stored. However, when the imaging device 5 does not have an input interface, the user cannot input the URL.

Therefore, the user displays, on a screen of a smartphone 63, the image code in which the address of the server 62 is embedded, captures the image code with the imaging device 5, and acquires the address of the server 62 from the image code.

The user captures a still image while orienting the optical axis of one of the fisheye lenses (the fisheye lens 14A) of the imaging device 5 substantially to the screen of the smartphone 63 and covering the other fisheye lens 14B with his or her hand.

The exposure control unit 50 of the input image processing module 34A and the exposure control unit 50 of the input image processing module 34B determine the average brightness values of all the input image data. When determining that the average brightness value is equal to or smaller than the threshold (for example, 40), the exposure control unit 50 of each of the input image processing modules 34A and 34B outputs the signal (e.g., the low brightness signal) indicating that the brightness is low to the distortion-correction and image-composite module 36.

When detecting the low brightness signal from the exposure control unit 50 of the input image processing module 34B, but not detecting the low brightness signal from the exposure control unit 50 of the input image processing module 34A, the distortion-correction and image-composite module 36 generates a hemispherical image from the image data input from the input image processing module 34A, which involves top-bottom correction and distortion correction, without compositing a spherical image. Then, the distortion-correction and image-composite module 36 transfers the generated hemispherical image to the main memory 31. By contrast, when detecting the low brightness signal from the exposure control unit 50 of the input image processing module 34A, but not detecting the low brightness signal from the exposure control unit 50 of the input image processing module 34B, the distortion-correction and image-composite module 36 generates a hemispherical image from the image data input from the input image processing module 34B, which involves top-bottom correction and distortion correction, without compositing a spherical image.

There may be cases where the low brightness signals are detected from both the exposure control units 50 of the input image processing modules 34A and 34B or not detected from both the exposure control units 50 of the input image processing modules 34A and 34B. In such cases, the distortion-correction and image-composite module 36 performs the composite processing and generates a spherical image, with distortion correction and top-bottom correction. Then, the distortion-correction and image-composite module 36 transfers the generated hemispherical image data to the main memory 31.

Subsequently, the image code detection unit 56 detects the image code from the hemispherical image or the spherical image stored in the main memory 31, decodes the image code, and obtains the address of the server 62. The image code detection unit 56 is implemented by the CPU 30 executing the control program stored in the flash ROM 32. Then, the address of the server 62 is stored in the main memory 31.

Thereafter, when the imaging device 5 captures a still image or a motion video, the image data transmission unit 60 transmits such image data to the address stored in the main memory 31. That is, these image data are transmitted to the server 62 via the wireless LAN access point 61.

When transmitting the image data captured by the imaging device 5 to the server 62 connected to the Internet, the wireless communication module 41 can transmit the data via a cellular network instead of the wireless LAN.

Figure 23:
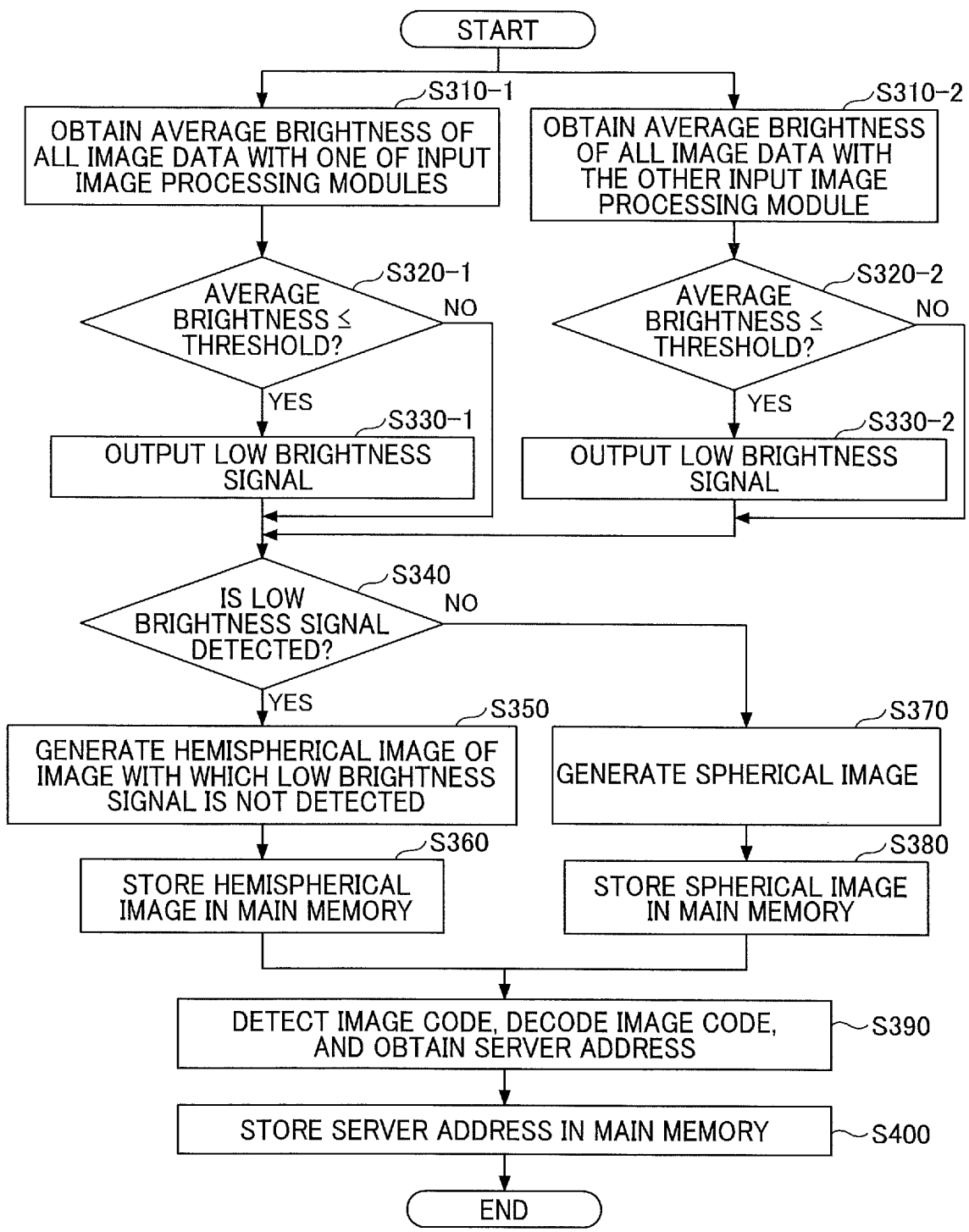
FIG. 23 is a flowchart illustrating an example of switching from a spherical image to a hemispherical image on the imaging device according to Embodiment 4.

FIG. 23 is a flowchart illustrating an example of operation of the imaging device 5 to switch from a spherical image to a hemispherical image and detect an image code.

In S310-1, the exposure control unit 50 of the input image processing module 34A obtains an average brightness of all image data (an example of first image data.)

In S320-1, the exposure control unit 50 of the input image processing module 34A determines whether or not the average brightness value is equal to or smaller than the threshold (for example, 40.)

When determining that the average brightness is equal to or smaller than the threshold, the exposure control unit 50 outputs the signal indicating that the brightness is low (e.g., the low brightness signal) to the distortion-correction and image-composite module 36 in S330-1.

The exposure control unit 50 of the input image processing module 34B calculates the average brightness value of all the image data (an example of second image data) in S310-2.

The exposure control unit 50 of the input image processing module 34B determines whether or not the average brightness value is equal to or smaller than the threshold (for example, 40) in S320-2.

When determining that the average brightness is equal to or smaller than the threshold, the exposure control unit 50 outputs the signal indicating that the brightness is low (e.g., the low brightness signal) to the distortion-correction and image-composite module 36 in S330-2.

In S340, the distortion-correction and image-composite module 36 determines whether the low brightness signal from either the input image processing module 34A or 34B is detected.

In response to a determination of "Yes" in S340, the distortion-correction and image-composite module 36 generates a hemispherical image based on the image input from the input image processing module 34 regarding which the low brightness signal is not detected, without performing the composition of the spherical image in S350.

The distortion-correction and image-composite module 36 stores the hemispherical image data in the main memory 31 in S360.

In response to the determination of "No" in S370, the distortion-correction and image-composite module 36 performs the composition to generate a spherical image in S370.

The distortion-correction and image-composite module 36 stores the spherical image data in the main memory 31 in S380.

The image code detection unit 56 detects the image code in the main memory 31, decodes the image code, and acquires the address of the server in S390.

The image code detection unit 56 stores the address of the server in the main memory 31 in S400.

Figure 24:
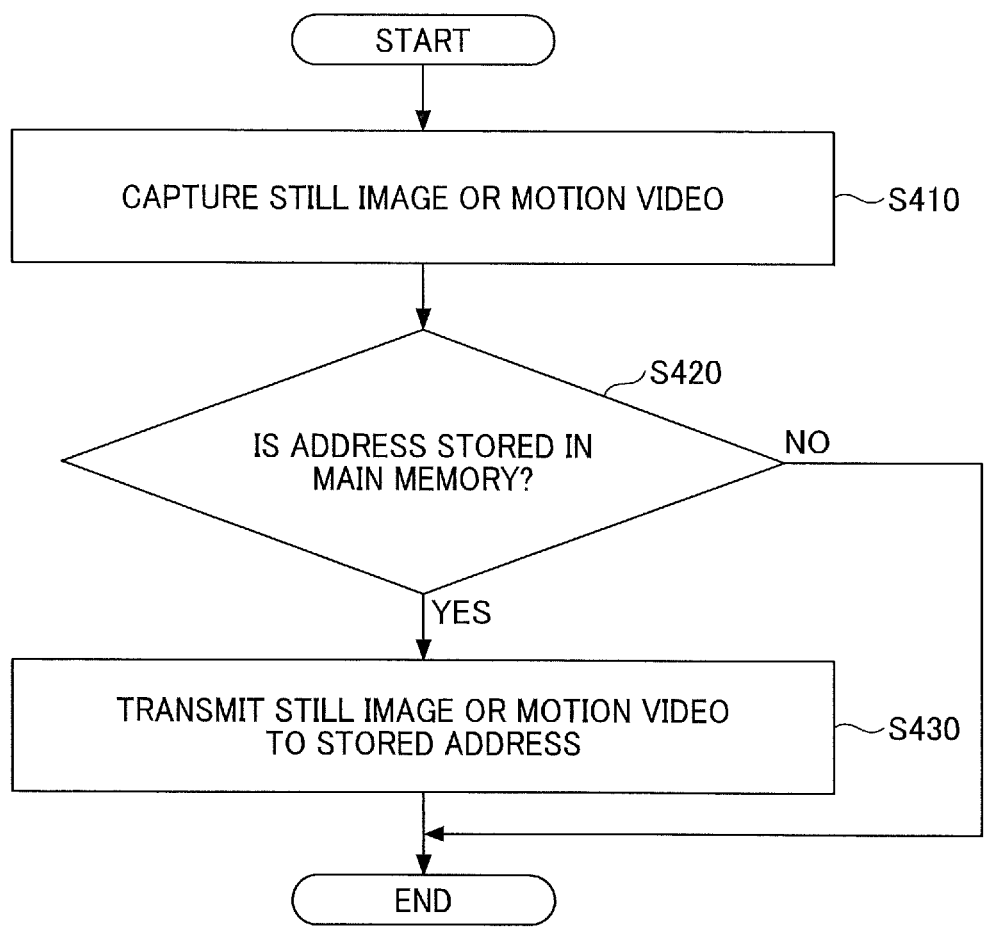
FIG. 24 is a flowchart illustrating an example of switching from a hemispherical image to a spherical image on the imaging device according to Embodiment 4.

FIG. 24 is a flowchart illustrating an example of operation to transmit, to the server, a still image or a motion video captured by the imaging device 5.

The imaging device 5 captures a still image or a motion video in S410. The image data transmission unit 60 determines whether an address is stored in the main memory 31 in S420. This determination is made based on whether data in a predetermined format representing an address is stored together with a label indicating the URL of the server. Alternatively, the determination can be made only based on data of a predetermined format representing an address.

In response to a determination of "Yes" in S420, the image data transmission unit 60 transmits the still image or motion video from the main memory 31 to the address (the server 62) in S430.

According to the present embodiment, in addition to the effects of Embodiment 1, the time required for searching for a subject can be reduced even when the subject is in a still image. In searching for information such as an image code from captured image data, the search range is narrowed from a spherical image to a hemispherical image. Accordingly, the time required to detect such an image code is shortened, and user convenience improves.

Embodiment 5 is described below.

In Embodiment 5, the imaging device 5 includes four sets of the fisheye lens 14, the image sensor 21, and the input image processing module 34.

Figure 25:
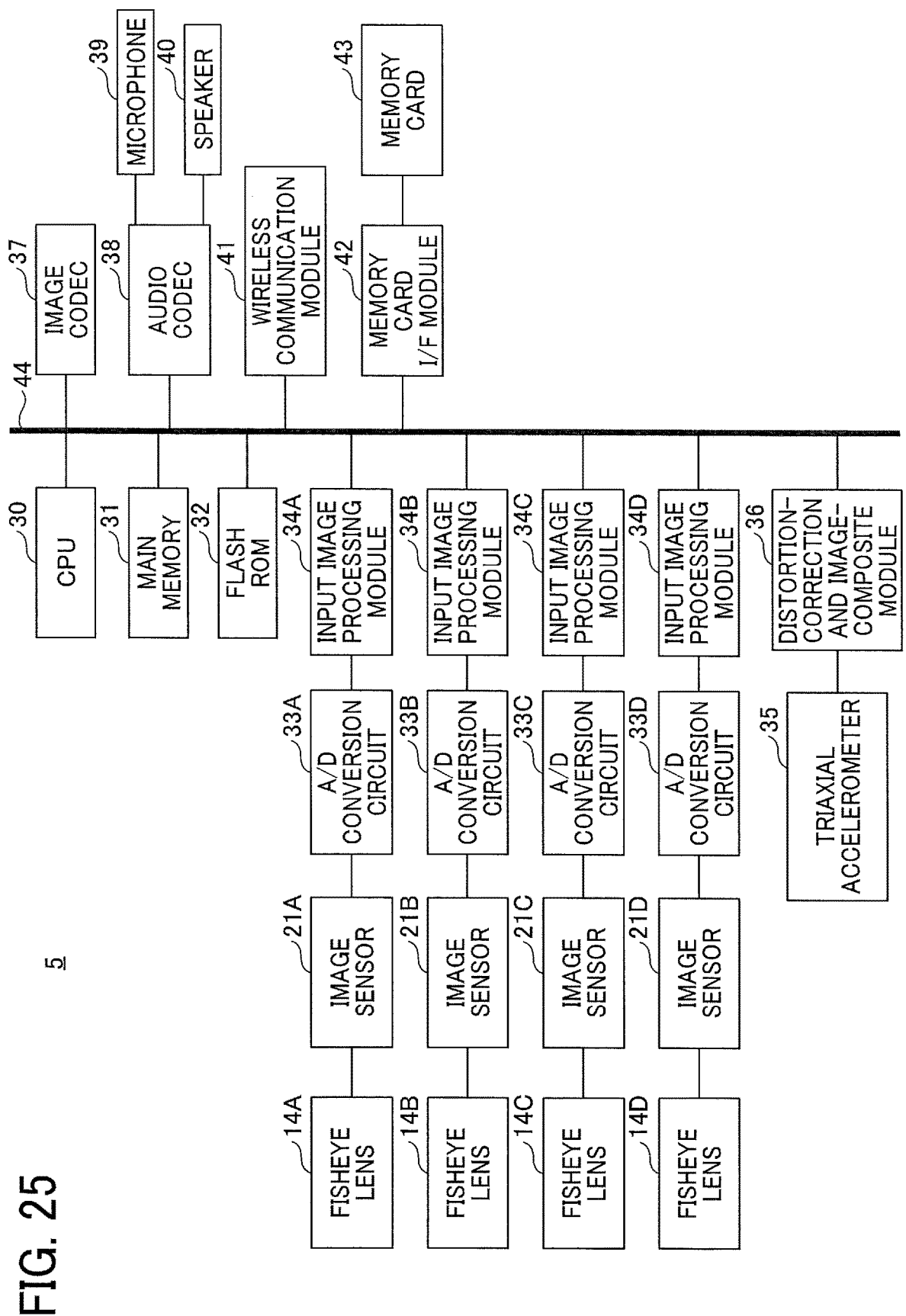
FIG. 25 is a schematic block diagram illustrating a hardware configuration of an imaging device according to Embodiment 5.

FIG. 25 is a schematic block diagram illustrating a hardware configuration of the imaging device 5 according to Embodiment 5. Elements of the present embodiment given reference characters that are the same as those in FIG. 5 operate similarly and attain the same effect. Accordingly, only the main elements that differ from those in FIG. 5 are described below.

The imaging device 5 of FIG. 25 is different from that of FIG. 5 in further including fisheye lenses 14C and 14D, image sensors 21C and 21D, A/D conversion circuits 33C and 33D, and input image processing modules 34C and 34D. Using the information from the triaxial accelerometer 35, the distortion-correction and image-composite module 36 performs distortion correction and top-down correction on the four image data to composite a spherical image. The angle of view of one set of the fisheye lens 14, the image sensor 21, the A/D conversion circuit 33, and the input image processing module 34 is 90 degrees, and a 360-degree image is generated with the four sets of such components.

A description is given of processing for a case where the amount of light input from the fisheye lenses 14A, 14B, 14C, and 14D changes, and the average brightness of all the image data of one frame input to the input image processing modules 34A, 34B, 34C, and 34D significantly differs from the average brightness of all the image data of the previous frame. The exposure control unit 50 of each of the input image processing modules 34A, 34B, 34C, and 34D calculates an average of the brightness component values of all the input image data of one frame, and stores the average brightness in the brightness storing unit 51. The average values A0, B0, C0, and D0 of the brightness component values of the input image processing modules 34A, 34B, 34C, and 34D are stored.

The brightness comparison unit 52 compares the average brightness value (average values A1, B1, C1, and D1) for one frame obtained by the exposure control unit 50 with the average brightness values (average values A0, B0, C0, and D0) of the previous frame, stored in the brightness storing unit 51. In the comparison, the brightness comparison unit 52 uses, for example, the average of the four brightness average values. When the difference between the average brightness values is equal to or greater than the threshold and the average brightness value of the current frame is equal to or smaller than the threshold, the input image processing modules 34A, 34B, 34C, and 34D output a low brightness signal to the distortion-correction and image-composite module 36.

When the difference in average brightness is equal to or greater than the threshold and the average brightness of the current frame is equal to or greater than the threshold, the input image processing modules 34A, 34B, 34C, and 34D output a high brightness signal to the distortion-correction and image-composite module 36.

In response to detection of the low brightness signal, the distortion-correction and image-composite module 36 stops composition of the spherical image. The distortion-correction and image-composite module 36 switches to generation of a 270-degree image based on the image data input from the other three (or less than three) input image processing modules 34 except the input image processing module 34 outputting the low brightness signal. The generation of the 270-degree image involves top-bottom correction and distortion correction. In response to detection of the high brightness signal, the distortion-correction and image-composite module 36 restarts the spherical image composite processing.

The imaging device 5 can include five or more sets of the fisheye lens 14, the image sensor 21, and the input image processing module 34.

According to the present embodiment, in the imaging device 5 that composites image data captured by three or more image sensors having a small angle of view, a 360-degree image can be switched to a 270-degree image (a 180-degree image, or 90-degree image), and a given range of the wide-angle image can be displayed.

According to an aspect of this disclosure, an imaging device stops the image processing of an unnecessary area of a wide-angle image, to easily present a desired subject in communication with a user at a remote site. According to another aspect of this disclosure, an imaging device can reduce the time required for detecting a desired subject.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

For example, although viewing of a real estate property is described above as an example, application of the image communication system 100 is not limited thereto. For example, aspects of the present disclosure can be adapted to presentation of a subject at a remote site, such as a showing, exhibition, factory tour, sightseeing tour, or inspection.

Further, although, in the present embodiment, a human captures a subject with the imaging device 5, a machine, a robot, or an animal may indicate the subject.

In addition, in the examples of the configurations illustrated in FIG. 11 and FIG. 21, the configurations are divided corresponding to the main functions for ease of understanding of the processes executed by the image communication system 100. The disclosure is not limited according to the way of dividing the processing unit or the names thereof. A process implemented by the image communication system 100 can be divided into a larger number of units depending on the content of process. In addition, such division can be such that a single processing unit includes a plurality of processes.

The image communication system 100 can include a plurality of communication management systems 70, or the functions of the communication management system 70 can be distributed to a plurality of servers. There can be a relay device that relays image data and sound data.

Each of the functions of the described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An imaging device configured to composite image data respectively captured by a plurality of image sensors to generate wide-angle image data having an angle greater than image data captured by a single one of the plurality of image sensors, the imaging device comprising:
the plurality of image sensors; and
circuitry configured to:
obtain an average brightness value of first image data and an average brightness value of second image data both captured by a same one of the plurality of image sensors, the second image data captured at a timing later than capture of the first image data;
obtain a difference between the average brightness value of the first image data and the average brightness value of the second image data;
determine whether the difference in average brightness value is equal to or greater than a first threshold;
determine whether the average brightness value of the second image data is equal to or smaller than a second threshold; and
in response to a determination that the difference in average brightness value is equal to or greater than the first threshold and the average brightness value of the second image data is equal to or smaller than the second threshold, perform one of output of image data captured by a rest of the plurality of image sensors excluding the one of the plurality of image sensors, and composition of the image data captured by the rest of the plurality of image sensors.

2. The imaging device according to claim 1, wherein the circuitry is configured to restart composition of the image data captured by the plurality of image sensors including the one of the plurality of image sensors, in response to a determination that the difference in average brightness value is equal to or greater than the first threshold and the average brightness value of the second image data is greater than the second threshold.

3. The imaging device according to claim 1,
wherein the circuitry is configured to:
obtain an average brightness value of a plurality of first image data including the first image data and an average brightness value of a plurality of second image data including the second image data, both captured by the same one of the plurality of image sensors, the plurality of second image data respectively captured at timings later than capture of the plurality of first image data;
obtain a difference between the average brightness value of the plurality of first image data and the average brightness value of the plurality of second image data; and
in response to a determination that the difference in average brightness value is equal to or greater than the first threshold and the average brightness value of the plurality of second image data is equal to or smaller than the second threshold, perform the one of output of the image data captured by the rest of the plurality of image sensors excluding the one of the plurality of image sensors, and composition of the image data captured by the rest of the plurality of image sensors.

4. The imaging device according to claim 3,
wherein the circuitry is configured to restart composition of the image data captured by the plurality of image sensors including the one of the plurality of image sensors, in response to a determination that the difference in average brightness value is equal to or greater than the first threshold and the average brightness value of the plurality of second image data is greater than the second threshold.

5. The imaging device according to claim 1,
wherein the circuitry is configured to:
divide each of the first image data and the second image data into a plurality of blocks;
obtain an average brightness value for each of the plurality of blocks;
obtain a difference between an average brightness value of the first image data and an average brightness value of the second image data for each of the plurality of blocks;
determine a number of brightness decrease blocks satisfying where the difference in average brightness value is equal to or greater than the first threshold and the average brightness value of the second image data is equal to or smaller than the second threshold; and
in response to a determination that the number of brightness decrease blocks is equal to or greater than a third threshold, perform the one of output of the image data captured by the rest of the plurality of image sensors excluding the one of the plurality of image sensors, and composition of the image data captured by the rest of the plurality of image sensors.

6. The imaging device according to claim 5, wherein the circuitry is configured to:
obtain, for each of the brightness decrease blocks, a difference between an average brightness value of other first image data and an average brightness value of other second image data, both captured by the one of the plurality of image sensors; and
restart composition of the image data captured by the plurality of image sensors including the one of the plurality of image sensors, in response to a determination that the difference in average brightness value is equal to or greater than the first threshold and the average brightness value of the second image data is greater than the second threshold in each of the brightness decrease blocks.

7. A method for compositing image data respectively captured by a plurality of image sensors to generate wide-angle image data having an angle greater than image data captured by a single one of the plurality of image sensors, the method comprising:
obtaining an average brightness value of first image data and an average brightness value of second image data both captured by a same one of the plurality of image sensors, the second image data captured at a timing later than capture of the first image data;
obtaining a difference between the average brightness value of the first image data and the average brightness value of the second image data;
determining whether the difference in average brightness value is equal to or greater than a first threshold;
determining whether the average brightness value of the second image data is equal to or smaller than a second threshold; and
in response to a determination that the difference in average brightness value is equal to or greater than the first threshold and the average brightness value of the second image data is equal to or smaller than the second threshold, performing one of output of image data captured by a rest of the plurality of image sensors excluding the one of the plurality of image sensors, and composition of the image data captured by the rest of the plurality of image sensors.

8. A non-transitory recording medium storing a plurality of program codes which, when executed by one or more processors, cause the processors to perform a method for compositing image data respectively captured by a plurality of image sensors to generate wide-angle image data having an angle greater than image data captured by a single one of the plurality of image sensors, the method comprising:

obtaining an average brightness value of first image data and an average brightness value of second image data both captured by a same one of the plurality of image sensors, the second image data captured at a timing later than capture of the first image data;

obtaining a difference between the average brightness value of the first image data and the average brightness value of the second image data;

determining whether the difference in average brightness value is equal to or greater than a first threshold;

determining whether the average brightness value of the second image data is equal to or smaller than a second threshold; and in response to a determination that the difference in average brightness value is equal to or greater than the first threshold and the average brightness value of the second image data is equal to or smaller than the second threshold, performing one of output of image data captured by a rest of the plurality of image sensors excluding the one of the plurality of image sensors, and composition of the image data captured by the rest of the plurality of image sensors.

* * * * *